United States Patent
Brady et al.

(10) Patent No.: US 12,291,069 B2
(45) Date of Patent: May 6, 2025

(54) VEHICLE HAVING SUSPENSION WITH CONTINUOUS DAMPING CONTROL

(71) Applicant: Polaris Industries Inc., Medina, MN (US)

(72) Inventors: Louis J. Brady, Wyoming, MN (US); Alex R. Scheuerell, White Bear Lake, MN (US); Steven R. Franker, Bethel, MN (US); Aaron J. Nysse, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/584,671

(22) Filed: Feb. 22, 2024

(65) Prior Publication Data

US 2024/0317009 A1  Sep. 26, 2024

Related U.S. Application Data

(63) Continuation of application No. 17/850,401, filed on Jun. 27, 2022, now Pat. No. 11,970,036, which is a
(Continued)

(51) Int. Cl.
*B60G 17/016* (2006.01)
*B60G 17/0165* (2006.01)
(Continued)

(52) U.S. Cl.
CPC ....... *B60G 17/0164* (2013.01); *B60G 17/016* (2013.01); *B60G 17/0162* (2013.01);
(Continued)

(58) Field of Classification Search
CPC ...... B60G 2400/104; B60G 2400/1042; B60G 2400/106; B60G 2400/1062; B60G 2400/20

See application file for complete search history.

(56) References Cited

U.S. PATENT DOCUMENTS 3,013,442 A   12/1961  Fox et al.
3,400,945 A    9/1968  Sampietro
(Continued)

FOREIGN PATENT DOCUMENTS

AU   2012323853 A1   5/2014
AU   2015328248 A1   5/2017
(Continued)

OTHER PUBLICATIONS

3Drive Compact Throttle Controller, Blitz Power USA, <http://pivotjp.com/product/thf_c/the.html>; earliest known archive via Internet Archive Wayback Machine Aug. 27, 2009; <http://web.archive.org/web/20090827154111/http://pivotjp.com/product/thf_c/the.html>; see appended screenshot retrieved from the Internet Nov. 30, 2015; 2 pages.
(Continued)

*Primary Examiner* — Toan C To
(74) *Attorney, Agent, or Firm* — Faegre Drinker Biddle & Reath LLP

(57) ABSTRACT

A damping control system for a vehicle having a suspension located between a plurality of ground engaging members and a vehicle frame includes at least one adjustable shock absorber having an adjustable damping characteristic. The system also includes a controller coupled to each adjustable shock absorber to adjust the damping characteristic of each adjustable shock absorber, and a user interface coupled to the controller and accessible to a driver of the vehicle. The user interface includes at least one user input to permit manual adjustment of the damping characteristic of the at least one adjustable shock absorber during operation of the vehicle. Vehicle sensors are also be coupled to the controller to adjust the damping characteristic of the at least one adjustable shock absorber based vehicle conditions determined by sensor output signals.

17 Claims, 12 Drawing Sheets

Related U.S. Application Data continuation of application No. 17/100,451, filed on Nov. 20, 2020, now Pat. No. 11,400,787, which is a continuation of application No. 16/013,210, filed on Jun. 20, 2018, now Pat. No. 11,124,036, which is a continuation of application No. 15/377,640, filed on Dec. 13, 2016, now Pat. No. 10,005,335, which is a continuation of application No. 14/935,184, filed on Nov. 6, 2015, now Pat. No. 9,527,362, which is a continuation of application No. 14/507,355, filed on Oct. 6, 2014, now Pat. No. 9,205,717, which is a continuation-in-part of application No. 14/074,340, filed on Nov. 7, 2013, now Pat. No. 9,662,954.

(60) Provisional application No. 61/723,623, filed on Nov. 7, 2012.

(51) Int. Cl.
- *B60G 17/018* (2006.01)
- *B60G 17/019* (2006.01)
- *B60G 17/06* (2006.01)
- *B60G 17/08* (2006.01)

(52) U.S. Cl.
CPC ....... *B60G 17/0165* (2013.01); *B60G 17/018* (2013.01); *B60G 17/019* (2013.01); *B60G 17/01908* (2013.01); *B60G 17/06* (2013.01); *B60G 17/08* (2013.01); *B60G 2300/07* (2013.01); *B60G 2300/32* (2013.01); *B60G 2300/322* (2013.01); *B60G 2400/102* (2013.01); *B60G 2400/204* (2013.01); *B60G 2400/252* (2013.01); *B60G 2400/33* (2013.01); *B60G 2400/39* (2013.01); *B60G 2400/40* (2013.01); *B60G 2400/61* (2013.01); *B60G 2500/10* (2013.01); *B60G 2600/02* (2013.01); *B60G 2600/04* (2013.01); *B60G 2600/20* (2013.01); *B60G 2600/70* (2013.01); *B60G 2800/014* (2013.01); *B60G 2800/162* (2013.01); *B60G 2800/916* (2013.01); *B60G 2800/94* (2013.01)

(56) References Cited

U.S. PATENT DOCUMENTS

| | | |
|---|---|---|
| 3,623,565 A | 11/1971 | Ward et al. |
| 3,737,001 A | 6/1973 | Rasenberger |
| 3,760,246 A | 9/1973 | Wright et al. |
| 3,861,229 A | 1/1975 | Domaas |
| 3,933,213 A | 1/1976 | Trowbridge |
| 3,952,829 A | 4/1976 | Gray |
| 3,982,446 A | 9/1976 | Van Dyken |
| 4,075,841 A | 2/1978 | Hamma et al. |
| 4,112,885 A | 9/1978 | Iwata et al. |
| 4,116,006 A | 9/1978 | Wallis |
| 4,319,658 A | 3/1982 | Collonia et al. |
| 4,327,948 A | 5/1982 | Beck et al. |
| 4,340,126 A | 7/1982 | Larson |
| 4,453,516 A | 6/1984 | Filsinger |
| 4,462,480 A | 7/1984 | Yasui et al. |
| 4,508,078 A | 4/1985 | Takeuchi et al. |
| 4,580,537 A | 4/1986 | Uchiyama |
| 4,600,215 A | 7/1986 | Kuroki et al. |
| 4,620,602 A | 11/1986 | Capriotti |
| 4,658,662 A | 4/1987 | Rundle |
| 4,671,235 A | 6/1987 | Hosaka |
| 4,681,292 A | 7/1987 | Thomas |
| 4,688,533 A | 8/1987 | Otobe |
| 4,691,676 A | 9/1987 | Kikuchi |
| 4,691,677 A | 9/1987 | Hotate et al. |
| 4,722,548 A | 2/1988 | Hamilton et al. |
| 4,741,554 A | 5/1988 | Okamoto |
| 4,749,210 A | 6/1988 | Sugasawa |
| 4,759,329 A | 7/1988 | Nobuo et al. |
| 4,765,296 A | 8/1988 | Ishikawa et al. |
| 4,779,895 A | 10/1988 | Rubel |
| 4,781,162 A | 11/1988 | Ishikawa et al. |
| 4,785,782 A | 11/1988 | Tanaka et al. |
| 4,787,353 A | 11/1988 | Ishikawa et al. |
| 4,805,923 A | 2/1989 | Soltis |
| 4,809,179 A | 2/1989 | Klingler et al. |
| 4,809,659 A | 3/1989 | Tamaki et al. |
| 4,817,466 A | 4/1989 | Kawamura et al. |
| 4,819,174 A | 4/1989 | Furuno et al. |
| 4,826,205 A | 5/1989 | Kouda et al. |
| 4,827,416 A | 5/1989 | Kawagoe et al. |
| 4,831,533 A | 5/1989 | Per-Harald |
| 4,838,780 A | 6/1989 | Yamagata et al. |
| 4,856,477 A | 8/1989 | Hanaoka et al. |
| 4,860,708 A | 8/1989 | Yamaguchi et al. |
| 4,862,854 A | 9/1989 | Oda et al. |
| 4,867,474 A | 9/1989 | Smith |
| 4,881,428 A | 11/1989 | Ishikawa et al. |
| 4,893,501 A | 1/1990 | Sogawa |
| 4,895,343 A | 1/1990 | Sato |
| 4,898,137 A | 2/1990 | Fujita et al. |
| 4,898,138 A | 2/1990 | Nishimura et al. |
| 4,901,695 A | 2/1990 | Kabasin et al. |
| 4,903,983 A | 2/1990 | Fukushima et al. |
| 4,905,783 A | 3/1990 | Bober |
| 4,913,006 A | 4/1990 | Tsuyama et al. |
| 4,919,097 A | 4/1990 | Mitui et al. |
| 4,926,636 A | 5/1990 | Tadokoro et al. |
| 4,927,170 A | 5/1990 | Wada |
| 4,930,082 A | 5/1990 | Harara et al. |
| 4,934,667 A | 6/1990 | Pees et al. |
| 4,949,262 A | 8/1990 | Buma et al. |
| 4,949,989 A | 8/1990 | Kakizaki et al. |
| 4,961,146 A | 10/1990 | Kajiwara |
| 4,966,247 A | 10/1990 | Masuda |
| 4,969,695 A | 11/1990 | Maehata et al. |
| 5,000,278 A | 3/1991 | Morishita |
| 5,002,028 A | 3/1991 | Arai et al. |
| 5,002,148 A | 3/1991 | Miyake et al. |
| 5,015,009 A | 5/1991 | Ohyama et al. |
| 5,018,408 A | 5/1991 | Bota et al. |
| 5,024,460 A * | 6/1991 | Hanson ............ B60G 17/018 280/5.519 |
| 5,029,328 A | 7/1991 | Kamimura et al. |
| 5,033,328 A | 7/1991 | Shimanaka |
| 5,036,939 A | 8/1991 | Johnson et al. |
| 5,037,128 A | 8/1991 | Okuyama et al. |
| 5,040,114 A | 8/1991 | Ishikawa et al. |
| 5,054,813 A | 10/1991 | Kakizaki |
| 5,060,744 A | 10/1991 | Katoh et al. |
| 5,062,657 A | 11/1991 | Majeed |
| 5,071,157 A | 12/1991 | Majeed |
| 5,071,158 A | 12/1991 | Yonekawa et al. |
| 5,076,385 A | 12/1991 | Terazawa et al. |
| 5,078,109 A | 1/1992 | Yoshida et al. |
| 5,080,392 A | 1/1992 | Bazergui |
| 5,083,811 A | 1/1992 | Sato et al. |
| 5,088,464 A | 2/1992 | Meaney |
| 5,092,298 A | 3/1992 | Suzuki et al. |
| 5,092,624 A | 3/1992 | Fukuyama et al. |
| 5,096,219 A | 3/1992 | Hanson et al. |
| 5,105,923 A | 4/1992 | Iizuka |
| 5,113,345 A | 5/1992 | Mine et al. |
| 5,113,821 A | 5/1992 | Fukui et al. |
| 5,114,177 A | 5/1992 | Fukunaga et al. |
| 5,129,475 A | 7/1992 | Kawano et al. |
| 5,144,559 A | 9/1992 | Kamimura et al. |
| 5,150,635 A | 9/1992 | Minowa et al. |
| 5,161,822 A | 11/1992 | Lund |
| 5,163,538 A | 11/1992 | Derr et al. |
| 5,170,343 A | 12/1992 | Matsuda |
| 5,174,263 A | 12/1992 | Meaney |
| 5,189,615 A | 2/1993 | Rubel et al. |
| 5,218,540 A | 6/1993 | Ishikawa et al. |
| 5,233,530 A | 8/1993 | Shimada et al. |
| 5,253,728 A | 10/1993 | Matsuno et al. |

(56) References Cited

U.S. PATENT DOCUMENTS

| | | | |
|---|---|---|---|
| 5,265,693 A | 11/1993 | Rees et al. |
| 5,307,777 A | 5/1994 | Sasajima et al. |
| 5,314,362 A | 5/1994 | Nagahora |
| 5,315,295 A | 5/1994 | Fujii |
| 5,337,239 A | 8/1994 | Okuda |
| 5,342,023 A | 8/1994 | Kuriki et al. |
| 5,343,396 A | 8/1994 | Youngblood |
| 5,343,780 A | 9/1994 | Mcdaniel et al. |
| 5,350,187 A | 9/1994 | Shinozaki |
| 5,361,209 A | 11/1994 | Tsutsumi |
| 5,361,213 A | 11/1994 | Fujieda et al. |
| 5,362,094 A | 11/1994 | Jensen |
| 5,366,236 A | 11/1994 | Kuriki et al. |
| 5,375,872 A | 12/1994 | Ohtagaki et al. |
| 5,377,107 A | 12/1994 | Shimizu et al. |
| 5,383,680 A | 1/1995 | Bock et al. |
| 5,384,705 A | 1/1995 | Inagaki et al. |
| 5,390,121 A | 2/1995 | Wolfe |
| 5,391,127 A | 2/1995 | Nishimura |
| RE34,906 E | 4/1995 | Tamaki et al. |
| 5,406,920 A | 4/1995 | Murata et al. |
| 5,413,540 A | 5/1995 | Streib et al. |
| 5,443,558 A | 8/1995 | Ibaraki et al. |
| 5,444,621 A | 8/1995 | Matsunaga et al. |
| 5,446,663 A | 8/1995 | Sasaki et al. |
| 5,467,751 A | 11/1995 | Kumagai |
| 5,475,593 A | 12/1995 | Townend |
| 5,475,596 A | 12/1995 | Henry et al. |
| 5,483,448 A | 1/1996 | Liubakka et al. |
| 5,485,161 A | 1/1996 | Vaughn |
| 5,490,487 A | 2/1996 | Kato et al. |
| 5,510,985 A | 4/1996 | Yamaoka et al. |
| 5,514,049 A | 5/1996 | Kamio et al. |
| 5,515,273 A | 5/1996 | Sasaki et al. |
| 5,521,825 A | 5/1996 | Unuvar et al. |
| 5,524,724 A | 6/1996 | Nishigaki et al. |
| 5,550,739 A | 8/1996 | Hoffmann et al. |
| 5,555,499 A | 9/1996 | Yamashita et al. |
| 5,575,737 A | 11/1996 | Weiss |
| 5,586,032 A | 12/1996 | Kallenbach et al. |
| 5,611,309 A | 3/1997 | Kumagai et al. |
| 5,630,623 A | 5/1997 | Ganzel |
| 5,632,503 A | 5/1997 | Raad et al. |
| 5,645,033 A | 7/1997 | Person et al. |
| 5,678,847 A | 10/1997 | Izawa et al. |
| 5,713,428 A | 2/1998 | Linden et al. |
| 5,749,596 A | 5/1998 | Jensen et al. |
| 5,774,820 A | 6/1998 | Linden et al. |
| 5,832,398 A | 11/1998 | Sasaki et al. |
| 5,845,726 A | 12/1998 | Kikkawa et al. |
| 5,873,802 A | 2/1999 | Tabata et al. |
| 5,880,532 A | 3/1999 | Stopher |
| 5,890,870 A | 4/1999 | Berger et al. |
| 5,897,287 A | 4/1999 | Berger et al. |
| 5,921,889 A | 7/1999 | Nozaki et al. |
| 5,922,038 A | 7/1999 | Horiuchi et al. |
| 5,938,556 A | 8/1999 | Lowell |
| 5,957,992 A | 9/1999 | Kiyono |
| 5,992,558 A | 11/1999 | Noro et al. |
| 6,000,702 A | 12/1999 | Streiter |
| 6,002,975 A | 12/1999 | Schiffmann et al. |
| 6,016,795 A | 1/2000 | Ohki |
| 6,019,085 A | 2/2000 | Sato et al. |
| 6,032,752 A | 3/2000 | Karpik et al. |
| 6,038,500 A | 3/2000 | Weiss |
| 6,070,681 A * | 6/2000 | Catanzarite ........ B62D 33/0608 |
| | | 180/89.15 |
| 6,073,072 A | 6/2000 | Ishii et al. |
| 6,073,074 A | 6/2000 | Saito et al. |
| 6,076,027 A | 6/2000 | Raad et al. |
| 6,078,252 A | 6/2000 | Kulczycki et al. |
| 6,086,510 A | 7/2000 | Kadota |
| 6,094,614 A | 7/2000 | Hiwatashi |
| 6,112,866 A | 9/2000 | Boichot et al. |
| 6,120,399 A | 9/2000 | Okeson et al. |
| 6,122,568 A | 9/2000 | Madau et al. |
| 6,124,826 A | 9/2000 | Garthwaite et al. |
| 6,125,326 A | 9/2000 | Ohmura et al. |
| 6,125,782 A | 10/2000 | Takashima et al. |
| 6,134,499 A | 10/2000 | Goode et al. |
| 6,138,069 A | 10/2000 | Ellertson et al. |
| 6,148,252 A | 11/2000 | Iwasaki et al. |
| 6,154,703 A | 11/2000 | Nakai et al. |
| 6,155,545 A | 12/2000 | Noro et al. |
| 6,157,297 A | 12/2000 | Nakai |
| 6,157,890 A | 12/2000 | Nakai et al. |
| 6,161,908 A | 12/2000 | Takayama et al. |
| 6,167,341 A | 12/2000 | Gourmelen et al. |
| 6,170,923 B1 | 1/2001 | Iguchi et al. |
| 6,176,796 B1 | 1/2001 | Lislegard |
| 6,178,371 B1 | 1/2001 | Light et al. |
| 6,181,997 B1 * | 1/2001 | Badenoch ............ B60G 17/015 |
| | | 701/72 |
| 6,192,305 B1 | 2/2001 | Schiffmann |
| 6,206,124 B1 | 3/2001 | Mallette et al. |
| 6,217,480 B1 | 4/2001 | Iwata et al. |
| 6,226,389 B1 | 5/2001 | Lemelson et al. |
| 6,240,365 B1 | 5/2001 | Bunn |
| 6,244,398 B1 | 6/2001 | Girvin et al. |
| 6,244,986 B1 | 6/2001 | Mori et al. |
| 6,249,728 B1 | 6/2001 | Streiter |
| 6,249,744 B1 | 6/2001 | Morita |
| 6,254,108 B1 | 7/2001 | Germain et al. |
| 6,260,650 B1 | 7/2001 | Gustavsson |
| 6,263,858 B1 | 7/2001 | Pursifull et al. |
| 6,275,763 B1 | 8/2001 | Lotito et al. |
| 6,276,333 B1 | 8/2001 | Kazama et al. |
| 6,288,534 B1 | 9/2001 | Starkweather et al. |
| 6,290,034 B1 | 9/2001 | Ichimaru |
| 6,318,337 B1 | 11/2001 | Pursifull |
| 6,318,490 B1 | 11/2001 | Laning |
| 6,343,248 B1 | 1/2002 | Rizzotto et al. |
| 6,351,704 B1 | 2/2002 | Koerner |
| 6,352,142 B1 | 3/2002 | Kim |
| 6,370,458 B1 * | 4/2002 | Shal ........................ B60G 17/04 |
| | | 180/41 |
| 6,370,472 B1 | 4/2002 | Fosseen |
| 6,371,884 B1 | 4/2002 | Channing |
| 6,379,114 B1 | 4/2002 | Schott et al. |
| 6,427,115 B1 | 7/2002 | Sekiyama |
| 6,456,908 B1 | 9/2002 | Kumar |
| 6,463,385 B1 | 10/2002 | Fry |
| 6,470,852 B1 | 10/2002 | Kanno |
| 6,476,714 B2 | 11/2002 | Mizuta |
| 6,483,201 B1 | 11/2002 | Klarer |
| 6,483,467 B2 | 11/2002 | Kushida et al. |
| 6,485,340 B1 | 11/2002 | Kolb et al. |
| 6,488,609 B1 | 12/2002 | Morimoto et al. |
| 6,502,025 B1 | 12/2002 | Kempen |
| 6,507,778 B2 | 1/2003 | Koh |
| 6,513,611 B2 | 2/2003 | Ito et al. |
| 6,526,342 B1 | 2/2003 | Burdock et al. |
| 6,551,153 B1 | 4/2003 | Hattori |
| 6,573,827 B1 | 6/2003 | McKenzie |
| 6,581,710 B2 | 6/2003 | Sprinkle et al. |
| 6,604,034 B1 | 8/2003 | Speck et al. |
| 6,644,318 B1 | 11/2003 | Adams et al. |
| 6,647,328 B2 | 11/2003 | Walker |
| 6,655,233 B2 | 12/2003 | Evans et al. |
| 6,657,539 B2 | 12/2003 | Yamamoto et al. |
| 6,675,577 B2 | 1/2004 | Evans |
| 6,684,140 B2 | 1/2004 | Lu |
| 6,685,174 B2 | 2/2004 | Behmenburg et al. |
| 6,699,085 B2 | 3/2004 | Hattori |
| 6,704,643 B1 | 3/2004 | Suhre et al. |
| 6,719,313 B2 | 4/2004 | Zadok |
| 6,738,705 B2 | 5/2004 | Kojima et al. |
| 6,738,708 B2 | 5/2004 | Suzuki et al. |
| 6,752,401 B2 | 6/2004 | Burdock |
| 6,757,606 B1 | 6/2004 | Gonring |
| 6,761,145 B2 | 7/2004 | Matsuda et al. |
| 6,772,061 B1 | 8/2004 | Berthiaume et al. |
| 6,795,764 B2 | 9/2004 | Schmitz et al. |
| 6,820,712 B2 | 11/2004 | Nakamura |

(56) References Cited

U.S. PATENT DOCUMENTS

| | | |
|---|---|---|
| 6,834,736 B2 | 12/2004 | Kramer et al. |
| 6,839,630 B2 | 1/2005 | Sakamoto |
| 6,845,314 B2 | 1/2005 | Fosseen |
| 6,845,829 B2 | 1/2005 | Hafendorfer |
| 6,848,420 B2 | 2/2005 | Ishiguro et al. |
| 6,848,956 B2 | 2/2005 | Ozawa |
| 6,851,495 B2 | 2/2005 | Sprinkle et al. |
| 6,851,679 B2 | 2/2005 | Downey et al. |
| 6,860,826 B1 | 3/2005 | Johnson |
| 6,874,467 B2 | 4/2005 | Hunt et al. |
| 6,876,924 B2 | 4/2005 | Morita et al. |
| 6,880,532 B1 | 4/2005 | Kerns et al. |
| 6,886,529 B2 | 5/2005 | Suzuki et al. |
| 6,887,182 B2 | 5/2005 | Nakatani et al. |
| 6,889,654 B2 | 5/2005 | Ito |
| 6,895,318 B1 * | 5/2005 | Barton .................. B60T 8/1755 701/41 |
| 6,895,518 B2 | 5/2005 | Wingen |
| 6,897,629 B2 | 5/2005 | Wilton et al. |
| 6,938,508 B1 | 9/2005 | Saagge |
| 6,941,209 B2 | 9/2005 | Liu |
| 6,942,050 B1 | 9/2005 | Honkala et al. |
| 6,945,541 B2 | 9/2005 | Brown |
| 6,964,259 B1 | 11/2005 | Raetzman |
| 6,964,260 B2 | 11/2005 | Samoto et al. |
| 6,976,689 B2 | 12/2005 | Hibbert |
| 6,990,401 B2 | 1/2006 | Neiss et al. |
| 7,005,976 B2 | 2/2006 | Hagenbuch |
| 7,011,174 B1 | 3/2006 | James |
| 7,032,895 B2 | 4/2006 | Folchert |
| 7,035,836 B2 | 4/2006 | Caponetto et al. |
| 7,036,485 B1 | 5/2006 | Koerner |
| 7,044,260 B2 | 5/2006 | Schaedler et al. |
| 7,055,454 B1 | 6/2006 | Whiting et al. |
| 7,055,497 B2 | 6/2006 | Maehara et al. |
| 7,055,545 B2 | 6/2006 | Mascari et al. |
| 7,058,490 B2 | 6/2006 | Kim |
| 7,058,506 B2 | 6/2006 | Kawase et al. |
| 7,066,142 B2 | 6/2006 | Hanasato |
| 7,070,012 B2 | 7/2006 | Fecteau |
| 7,076,351 B2 | 7/2006 | Hamilton et al. |
| 7,077,713 B2 | 7/2006 | Watabe et al. |
| 7,077,784 B2 | 7/2006 | Banta et al. |
| 7,086,379 B2 | 8/2006 | Blomenberg et al. |
| 7,092,808 B2 | 8/2006 | Lu et al. |
| 7,096,851 B2 | 8/2006 | Matsuda et al. |
| 7,097,166 B2 | 8/2006 | Folchert |
| 7,104,352 B2 | 9/2006 | Weinzierl |
| 7,123,189 B2 | 10/2006 | Lalik et al. |
| 7,124,865 B2 | 10/2006 | Turner et al. |
| 7,136,729 B2 | 11/2006 | Salman et al. |
| 7,140,619 B2 | 11/2006 | Hrovat et al. |
| 7,163,000 B2 | 1/2007 | Ishida et al. |
| 7,168,709 B2 | 1/2007 | Niwa et al. |
| 7,171,945 B2 | 2/2007 | Matsuda et al. |
| 7,171,947 B2 | 2/2007 | Fukushima et al. |
| 7,182,063 B2 | 2/2007 | Keefover et al. |
| 7,184,873 B1 | 2/2007 | Idsinga et al. |
| 7,185,630 B2 | 3/2007 | Takahashi et al. |
| 7,220,153 B2 | 5/2007 | Okuyama |
| 7,233,846 B2 | 6/2007 | Kawauchi et al. |
| 7,234,707 B2 | 6/2007 | Green et al. |
| 7,235,963 B2 | 6/2007 | Wayama |
| 7,249,986 B2 | 7/2007 | Otobe et al. |
| 7,259,357 B2 | 8/2007 | Walker |
| 7,260,319 B2 | 8/2007 | Watanabe et al. |
| 7,260,471 B2 | 8/2007 | Matsuda et al. |
| 7,270,335 B2 | 9/2007 | Hio et al. |
| 7,280,904 B2 | 10/2007 | Kaji |
| 7,286,919 B2 | 10/2007 | Nordgren et al. |
| 7,287,511 B2 | 10/2007 | Matsuda |
| 7,287,760 B1 | 10/2007 | Quick et al. |
| 7,305,295 B2 | 12/2007 | Bauerle et al. |
| 7,311,082 B2 | 12/2007 | Yokoi |
| 7,315,779 B1 | 1/2008 | Rioux et al. |
| 7,316,288 B1 | 1/2008 | Bennett et al. |
| 7,318,410 B2 | 1/2008 | Yokoi |
| 7,318,593 B2 | 1/2008 | Sterly et al. |
| 7,322,435 B2 | 1/2008 | Lillbacka et al. |
| 7,325,533 B2 | 2/2008 | Matsuda |
| 7,331,326 B2 | 2/2008 | Arai et al. |
| 7,354,321 B2 | 4/2008 | Takada et al. |
| 7,359,787 B2 | 4/2008 | Ono et al. |
| 7,367,247 B2 | 5/2008 | Horiuchi et al. |
| 7,367,316 B2 | 5/2008 | Russell et al. |
| 7,367,854 B2 | 5/2008 | Arvidsson |
| 7,380,538 B1 | 6/2008 | Gagnon et al. |
| 7,386,378 B2 | 6/2008 | Lauwerys et al. |
| 7,399,210 B2 | 7/2008 | Yoshimasa |
| 7,401,794 B2 | 7/2008 | Laurent et al. |
| 7,413,196 B2 | 8/2008 | Borowski |
| 7,416,458 B2 | 8/2008 | Suemori et al. |
| 7,421,954 B2 | 9/2008 | Bose |
| 7,422,495 B2 | 9/2008 | Kinoshita et al. |
| 7,427,072 B2 | 9/2008 | Brown |
| 7,431,013 B2 | 10/2008 | Hotta et al. |
| 7,433,774 B2 | 10/2008 | Sen et al. |
| 7,441,789 B2 | 10/2008 | Geiger et al. |
| 7,445,071 B2 | 11/2008 | Yamazaki et al. |
| 7,454,282 B2 | 11/2008 | Mizuguchi |
| 7,454,284 B2 | 11/2008 | Fosseen |
| 7,458,360 B2 | 12/2008 | Irihune et al. |
| 7,461,630 B2 | 12/2008 | Maruo et al. |
| 7,475,746 B2 | 1/2009 | Tsukada et al. |
| 7,478,689 B1 | 1/2009 | Sugden et al. |
| 7,483,775 B2 | 1/2009 | Karaba et al. |
| 7,486,199 B2 | 2/2009 | Tengler et al. |
| 7,505,836 B2 | 3/2009 | Okuyama et al. |
| 7,506,633 B2 | 3/2009 | Cowan |
| 7,510,060 B2 | 3/2009 | Izawa et al. |
| 7,523,737 B2 | 4/2009 | Deguchi et al. |
| 7,526,665 B2 | 4/2009 | Kim et al. |
| 7,529,609 B2 | 5/2009 | Braunberger et al. |
| 7,530,345 B1 | 5/2009 | Plante et al. |
| 7,533,750 B2 | 5/2009 | Simmons et al. |
| 7,533,890 B2 | 5/2009 | Chiao |
| 7,571,039 B2 | 8/2009 | Chen et al. |
| 7,571,073 B2 | 8/2009 | Gamberini et al. |
| 7,598,849 B2 | 10/2009 | Gallant et al. |
| 7,600,762 B2 | 10/2009 | Yasui et al. |
| 7,611,154 B2 | 11/2009 | Delaney |
| 7,630,807 B2 | 12/2009 | Yoshimura et al. |
| 7,641,208 B1 | 1/2010 | Barron et al. |
| 7,644,934 B2 | 1/2010 | Mizuta |
| 7,647,143 B2 | 1/2010 | Ito et al. |
| 7,684,911 B2 | 3/2010 | Seifert et al. |
| 7,707,012 B2 | 4/2010 | Stephens |
| 7,711,468 B1 | 5/2010 | Levy |
| 7,740,256 B2 | 6/2010 | Davis |
| 7,751,959 B2 | 7/2010 | Boon et al. |
| 7,771,313 B2 | 8/2010 | Cullen et al. |
| 7,778,741 B2 | 8/2010 | Rao et al. |
| 7,810,818 B2 | 10/2010 | Bushko |
| 7,815,205 B2 | 10/2010 | Barth et al. |
| 7,822,514 B1 | 10/2010 | Erickson |
| 7,823,106 B2 | 10/2010 | Baker et al. |
| 7,823,891 B2 | 11/2010 | Bushko et al. |
| 7,826,959 B2 | 11/2010 | Namari et al. |
| 7,862,061 B2 | 1/2011 | Jung |
| 7,885,750 B2 | 2/2011 | Lu |
| 7,899,594 B2 | 3/2011 | Messih et al. |
| 7,912,610 B2 | 3/2011 | Saito et al. |
| 7,926,822 B2 | 4/2011 | Ohletz et al. |
| 7,940,383 B2 | 5/2011 | Noguchi et al. |
| 7,942,427 B2 | 5/2011 | Lloyd |
| 7,950,486 B2 | 5/2011 | Van et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,970,512 B2 | 6/2011 | Lu et al. |
| 7,975,794 B2 | 7/2011 | Simmons |
| 7,984,915 B2 | 7/2011 | Post et al. |
| 8,005,596 B2 | 8/2011 | Lu et al. |
| 8,027,775 B2 | 9/2011 | Takenaka et al. |

(56) References Cited

U.S. PATENT DOCUMENTS

| | | | |
|---|---|---|---|
| 8,032,281 B2 | 10/2011 | Bujak et al. | |
| 8,050,818 B2 | 11/2011 | Mizuta | |
| 8,050,857 B2 | 11/2011 | Lu et al. | |
| 8,056,392 B2 | 11/2011 | Ryan et al. | |
| 8,065,054 B2 | 11/2011 | Tarasinski et al. | |
| 8,075,002 B1 | 12/2011 | Pionke et al. | |
| 8,086,371 B2 | 12/2011 | Furuichi et al. | |
| 8,087,676 B2 | 1/2012 | McIntyre | |
| 8,095,268 B2 | 1/2012 | Parison et al. | |
| 8,108,104 B2 | 1/2012 | Hrovat et al. | |
| 8,113,521 B2 | 2/2012 | Lin et al. | |
| 8,116,938 B2 | 2/2012 | Itagaki et al. | |
| 8,121,757 B2 | 2/2012 | Song et al. | |
| 8,170,749 B2 | 5/2012 | Mizuta | |
| 8,190,327 B2 | 5/2012 | Poilbout | |
| 8,195,361 B2* | 6/2012 | Kajino | B60G 17/016 701/37 |
| 8,204,666 B2 | 6/2012 | Takeuchi et al. | |
| 8,209,087 B2 | 6/2012 | Haegglund et al. | |
| 8,214,106 B2 | 7/2012 | Ghoneim et al. | |
| 8,219,262 B2 | 7/2012 | Stiller | |
| 8,229,642 B2 | 7/2012 | Post et al. | |
| 8,260,496 B2 | 9/2012 | Gagliano | |
| 8,271,175 B2 | 9/2012 | Takenaka et al. | |
| 8,296,010 B2 | 10/2012 | Hirao et al. | |
| 8,308,170 B2 | 11/2012 | Van et al. | |
| 8,315,764 B2 | 11/2012 | Chen et al. | |
| 8,315,769 B2 | 11/2012 | Braunberger et al. | |
| 8,321,088 B2 | 11/2012 | Brown et al. | |
| 8,322,497 B2 | 12/2012 | Marjoram et al. | |
| 8,352,143 B2 | 1/2013 | Lu et al. | |
| 8,355,840 B2 | 1/2013 | Ammon et al. | |
| 8,359,149 B2 | 1/2013 | Shin | |
| 8,374,748 B2 | 2/2013 | Jolly | |
| 8,376,373 B2 | 2/2013 | Conradie | |
| 8,382,130 B2 | 2/2013 | Nakamura | |
| 8,396,627 B2 | 3/2013 | Jung et al. | |
| 8,417,417 B2 | 4/2013 | Chen et al. | |
| 8,424,832 B2 | 4/2013 | Robbins et al. | |
| 8,428,839 B2 | 4/2013 | Braunberger et al. | |
| 8,434,774 B2 | 5/2013 | Leclerc et al. | |
| 8,437,935 B2 | 5/2013 | Braunberger et al. | |
| 8,442,720 B2 | 5/2013 | Lu et al. | |
| 8,444,161 B2 | 5/2013 | Leclerc et al. | |
| 8,447,489 B2 | 5/2013 | Murata et al. | |
| 8,457,841 B2 | 6/2013 | Knoll et al. | |
| 8,473,157 B2 | 6/2013 | Savaresi et al. | |
| 8,517,395 B2 | 8/2013 | Knox et al. | |
| 8,532,896 B2 | 9/2013 | Braunberger et al. | |
| 8,534,397 B2 | 9/2013 | Grajkowski et al. | |
| 8,534,413 B2 | 9/2013 | Nelson et al. | |
| 8,548,678 B2 | 10/2013 | Ummethala et al. | |
| 8,550,221 B2 | 10/2013 | Paulides et al. | |
| 8,571,776 B2 | 10/2013 | Braunberger et al. | |
| 8,573,605 B2 | 11/2013 | Di Maria | |
| 8,626,388 B2 | 1/2014 | Oikawa | |
| 8,626,389 B2 | 1/2014 | Sidlosky | |
| 8,641,052 B2 | 2/2014 | Kondo et al. | |
| 8,645,024 B2 | 2/2014 | Daniels | |
| 8,651,503 B2 | 2/2014 | Rhodig | |
| 8,666,596 B2 | 3/2014 | Arenz | |
| 8,672,106 B2 | 3/2014 | Laird et al. | |
| 8,672,337 B2 | 3/2014 | Van et al. | |
| 8,676,440 B2 | 3/2014 | Watson | |
| 8,682,530 B2* | 3/2014 | Nakamura | B60G 13/16 280/124.108 |
| 8,682,550 B2 | 3/2014 | Nelson et al. | |
| 8,682,558 B2 | 3/2014 | Braunberger et al. | |
| 8,684,887 B2 | 4/2014 | Krosschell | |
| 8,700,260 B2 | 4/2014 | Jolly et al. | |
| 8,712,599 B1 | 4/2014 | Westpfahl | |
| 8,712,639 B2 | 4/2014 | Lu et al. | |
| 8,718,872 B2 | 5/2014 | Hirao et al. | |
| 8,725,351 B1 | 5/2014 | Selden et al. | |
| 8,725,380 B2 | 5/2014 | Braunberger et al. | |
| 8,731,774 B2 | 5/2014 | Yang | |
| 8,770,594 B2 | 7/2014 | Tominaga et al. | |
| 8,827,019 B2 | 9/2014 | Deckard et al. | |
| 8,903,617 B2 | 12/2014 | Braunberger et al. | |
| 8,954,251 B2 | 2/2015 | Braunberger et al. | |
| 8,972,712 B2 | 3/2015 | Braunberger | |
| 8,973,930 B2 | 3/2015 | Rhodig | |
| 8,994,494 B2 | 3/2015 | Koenig et al. | |
| 8,997,952 B2 | 4/2015 | Getz et al. | |
| 9,010,768 B2 | 4/2015 | Kinsman et al. | |
| 9,027,937 B2 | 5/2015 | Ryan et al. | |
| 9,038,791 B2 | 5/2015 | Marking | |
| 9,050,869 B1 | 6/2015 | Pelzer | |
| 9,123,249 B2 | 9/2015 | Braunberger et al. | |
| 9,150,070 B2 | 10/2015 | Luttinen et al. | |
| 9,151,384 B2 | 10/2015 | Kohler et al. | |
| 9,162,573 B2 | 10/2015 | Grajkowski et al. | |
| 9,186,952 B2 | 11/2015 | Yleva | |
| 9,205,717 B2* | 12/2015 | Brady | B60G 17/0165 |
| 9,211,924 B2 | 12/2015 | Safranski et al. | |
| 9,327,726 B2 | 5/2016 | Braunberger et al. | |
| 9,327,789 B1 | 5/2016 | Vezina et al. | |
| 9,365,251 B2 | 6/2016 | Safranski et al. | |
| 9,371,002 B2 | 6/2016 | Braunberger | |
| 9,381,810 B2 | 7/2016 | Nelson et al. | |
| 9,381,902 B2 | 7/2016 | Braunberger et al. | |
| 9,428,242 B2 | 8/2016 | Ginther et al. | |
| 9,429,235 B2 | 8/2016 | Krosschell et al. | |
| 9,527,362 B2* | 12/2016 | Brady | B60G 17/01908 |
| 9,643,538 B2 | 5/2017 | Braunberger et al. | |
| 9,643,616 B2 | 5/2017 | Lu | |
| 9,662,954 B2* | 5/2017 | Brady | B60G 17/016 |
| 9,665,418 B2 | 5/2017 | Arnott et al. | |
| 9,695,899 B2 | 7/2017 | Smith et al. | |
| 9,771,084 B2 | 9/2017 | Norstad | |
| 9,802,621 B2 | 10/2017 | Gillingham et al. | |
| 9,809,195 B2 | 11/2017 | Giese et al. | |
| 9,830,821 B2 | 11/2017 | Braunberger et al. | |
| 9,834,184 B2 | 12/2017 | Braunberger | |
| 9,834,215 B2 | 12/2017 | Braunberger et al. | |
| 9,855,986 B2 | 1/2018 | Braunberger et al. | |
| 9,868,385 B2 | 1/2018 | Braunberger | |
| 9,878,693 B2 | 1/2018 | Braunberger | |
| 9,920,810 B2 | 3/2018 | Smeljanskij et al. | |
| 9,937,762 B2 | 4/2018 | Sunahiro | |
| 9,945,298 B2 | 4/2018 | Braunberger et al. | |
| 10,005,335 B2* | 6/2018 | Brady | B60G 17/06 |
| 10,046,694 B2 | 8/2018 | Braunberger et al. | |
| 10,086,698 B2 | 10/2018 | Grajkowski et al. | |
| 10,137,873 B2 | 11/2018 | Bowers et al. | |
| 10,154,377 B2 | 12/2018 | Post et al. | |
| 10,189,428 B1 | 1/2019 | Sellars et al. | |
| 10,195,989 B2 | 2/2019 | Braunberger et al. | |
| 10,202,159 B2 | 2/2019 | Braunberger et al. | |
| 10,207,554 B2 | 2/2019 | Schroeder et al. | |
| 10,220,765 B2 | 3/2019 | Braunberger | |
| 10,227,041 B2 | 3/2019 | Braunberger et al. | |
| 10,266,164 B2 | 4/2019 | Braunberger | |
| 10,363,941 B2 | 7/2019 | Norstad | |
| 10,384,682 B2 | 8/2019 | Braunberger et al. | |
| 10,391,989 B2 | 8/2019 | Braunberger | |
| 10,406,884 B2 | 9/2019 | Oakden-Graus et al. | |
| 10,410,520 B2 | 9/2019 | Braunberger et al. | |
| 10,436,125 B2 | 10/2019 | Braunberger et al. | |
| 10,450,006 B2 | 10/2019 | Kinsman et al. | |
| 10,479,408 B2 | 11/2019 | Upah et al. | |
| 10,578,184 B2 | 3/2020 | Gilbert et al. | |
| 10,704,640 B2 | 7/2020 | Galasso et al. | |
| 10,723,408 B2 | 7/2020 | Pelot | |
| 10,731,724 B2 | 8/2020 | Laird et al. | |
| 10,774,896 B2 | 9/2020 | Hamers et al. | |
| 10,933,710 B2 | 3/2021 | Tong | |
| 10,975,780 B2 | 4/2021 | Wishin et al. | |
| 10,981,429 B2 | 4/2021 | Tsiaras et al. | |
| 11,001,120 B2 | 5/2021 | Cox | |
| 11,110,913 B2 | 9/2021 | Krosschell et al. | |
| 11,124,036 B2 | 9/2021 | Brady et al. | |
| 11,142,033 B2 | 10/2021 | Yoshida et al. | |
| 11,148,748 B2 | 10/2021 | Galasso | |

(56) References Cited

U.S. PATENT DOCUMENTS

| | | |
|---|---|---|
| 11,152,555 B2 | 10/2021 | Hiller |
| 11,162,555 B2 | 11/2021 | Haugen |
| 11,192,414 B1 | 12/2021 | Berardi |
| 11,192,424 B2 | 12/2021 | Tabata et al. |
| 11,279,198 B2 | 3/2022 | Marking |
| 11,285,964 B2 | 3/2022 | Norstad et al. |
| 11,306,798 B2 | 4/2022 | Cox et al. |
| 11,351,834 B2 | 6/2022 | Cox |
| 11,364,762 B2 | 6/2022 | Hadi |
| 11,400,784 B2 | 8/2022 | Brady et al. |
| 11,400,785 B2 | 8/2022 | Brady et al. |
| 11,400,786 B2 | 8/2022 | Brady et al. |
| 11,400,787 B2 | 8/2022 | Brady et al. |
| 11,413,924 B2 | 8/2022 | Cox et al. |
| 11,448,283 B2 | 9/2022 | Strickland |
| 11,472,252 B2 | 10/2022 | Tong |
| 11,479,075 B2 | 10/2022 | Graus et al. |
| 11,975,584 B2 | 5/2024 | Graus et al. |
| 2001/0005803 A1 | 6/2001 | Cochofel et al. |
| 2001/0021887 A1 | 9/2001 | Obradovich et al. |
| 2001/0035166 A1 | 11/2001 | Kerns et al. |
| 2001/0052756 A1 | 12/2001 | Noro et al. |
| 2002/0082752 A1 | 6/2002 | Obradovich |
| 2002/0113185 A1 | 8/2002 | Ziegler |
| 2002/0113393 A1 | 8/2002 | Urbach |
| 2002/0115357 A1 | 8/2002 | Hiki et al. |
| 2002/0125675 A1 | 9/2002 | Clements et al. |
| 2002/0177949 A1 | 11/2002 | Katayama et al. |
| 2002/0193935 A1 | 12/2002 | Hashimoto et al. |
| 2003/0014174 A1 | 1/2003 | Giers |
| 2003/0036360 A1 | 2/2003 | Russell et al. |
| 2003/0036823 A1 | 2/2003 | Mahvi |
| 2003/0038411 A1 | 2/2003 | Sendrea |
| 2003/0046000 A1 | 3/2003 | Morita et al. |
| 2003/0047994 A1 | 3/2003 | Koh |
| 2003/0054831 A1 | 3/2003 | Bardmesser |
| 2003/0062025 A1 | 4/2003 | Samoto et al. |
| 2003/0125857 A1 | 7/2003 | Madau et al. |
| 2003/0187555 A1 | 10/2003 | Lutz et al. |
| 2003/0200016 A1 | 10/2003 | Spillane et al. |
| 2003/0205867 A1 | 11/2003 | Coelingh et al. |
| 2004/0010383 A1 | 1/2004 | Lu et al. |
| 2004/0015275 A1 | 1/2004 | Herzog et al. |
| 2004/0024515 A1 | 2/2004 | Troupe et al. |
| 2004/0026880 A1 | 2/2004 | Bundy |
| 2004/0034460 A1 | 2/2004 | Folkerts et al. |
| 2004/0041358 A1 | 3/2004 | Hrovat et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0216550 A1 | 11/2004 | Fallak et al. |
| 2004/0226538 A1 | 11/2004 | Cannone et al. |
| 2004/0245034 A1 | 12/2004 | Miyamoto et al. |
| 2005/0004736 A1 | 1/2005 | Belcher et al. |
| 2005/0023789 A1 | 2/2005 | Suzuki et al. |
| 2005/0027428 A1 | 2/2005 | Glora et al. |
| 2005/0045148 A1 | 3/2005 | Katsuragawa et al. |
| 2005/0077696 A1 | 4/2005 | Ogawa |
| 2005/0098964 A1 | 5/2005 | Brown |
| 2005/0131604 A1 | 6/2005 | Lu |
| 2005/0133006 A1 | 6/2005 | Frenz et al. |
| 2005/0149246 A1 | 7/2005 | McLeod |
| 2005/0155571 A1 | 7/2005 | Hanasato |
| 2005/0217953 A1 | 10/2005 | Bossard |
| 2005/0267663 A1* | 12/2005 | Naono ............... G05B 13/024 701/36 |
| 2005/0279244 A1 | 12/2005 | Bose |
| 2005/0280219 A1 | 12/2005 | Brown |
| 2005/0284446 A1 | 12/2005 | Okuyama |
| 2006/0014606 A1 | 1/2006 | Sporl et al. |
| 2006/0017240 A1 | 1/2006 | Laurent et al. |
| 2006/0018636 A1 | 1/2006 | Watanabe et al. |
| 2006/0052909 A1 | 3/2006 | Cherouny |
| 2006/0064223 A1 | 3/2006 | Voss |
| 2006/0065239 A1 | 3/2006 | Tsukada et al. |
| 2006/0112930 A1 | 6/2006 | Matsuda et al. |
| 2006/0162681 A1 | 7/2006 | Kawasaki |
| 2006/0191739 A1 | 8/2006 | Koga |
| 2006/0224294 A1 | 10/2006 | Kawazoe et al. |
| 2006/0226611 A1 | 10/2006 | Xiao et al. |
| 2006/0229811 A1 | 10/2006 | Herman et al. |
| 2006/0235602 A1 | 10/2006 | Ishida et al. |
| 2006/0243246 A1 | 11/2006 | Yokoi |
| 2006/0243247 A1 | 11/2006 | Yokoi |
| 2006/0247840 A1 | 11/2006 | Matsuda et al. |
| 2006/0270520 A1 | 11/2006 | Owens |
| 2006/0278197 A1* | 12/2006 | Takamatsu ............ F02D 41/021 123/399 |
| 2006/0284387 A1 | 12/2006 | Klees |
| 2007/0007742 A1 | 1/2007 | Allen et al. |
| 2007/0023566 A1 | 2/2007 | Howard |
| 2007/0028888 A1 | 2/2007 | Jasem |
| 2007/0039770 A1 | 2/2007 | Barrette et al. |
| 2007/0045028 A1 | 3/2007 | Yamamoto et al. |
| 2007/0050095 A1 | 3/2007 | Nelson et al. |
| 2007/0050125 A1 | 3/2007 | Matsuda et al. |
| 2007/0068490 A1 | 3/2007 | Matsuda |
| 2007/0073461 A1 | 3/2007 | Fielder |
| 2007/0096672 A1 | 5/2007 | Endo et al. |
| 2007/0118268 A1 | 5/2007 | Inoue et al. |
| 2007/0119419 A1 | 5/2007 | Matsuda |
| 2007/0120332 A1 | 5/2007 | Bushko et al. |
| 2007/0126628 A1 | 6/2007 | Lalik et al. |
| 2007/0142167 A1 | 6/2007 | Kanafani et al. |
| 2007/0151544 A1 | 7/2007 | Arai et al. |
| 2007/0158920 A1 | 7/2007 | Delaney |
| 2007/0168125 A1 | 7/2007 | Petrik |
| 2007/0169744 A1 | 7/2007 | Maruo et al. |
| 2007/0178779 A1 | 8/2007 | Takada et al. |
| 2007/0192001 A1 | 8/2007 | Tatsumi et al. |
| 2007/0213920 A1 | 9/2007 | Igarashi et al. |
| 2007/0227796 A1 | 10/2007 | Simmons et al. |
| 2007/0239331 A1 | 10/2007 | Kaplan |
| 2007/0240917 A1 | 10/2007 | Duceppe |
| 2007/0244619 A1 | 10/2007 | Peterson |
| 2007/0246010 A1 | 10/2007 | Okuyama et al. |
| 2007/0247291 A1 | 10/2007 | Masuda et al. |
| 2007/0255462 A1 | 11/2007 | Masuda et al. |
| 2007/0255466 A1 | 11/2007 | Chiao |
| 2007/0260372 A1 | 11/2007 | Langer |
| 2007/0271026 A1 | 11/2007 | Hijikata |
| 2007/0294008 A1 | 12/2007 | Yasui et al. |
| 2008/0004773 A1 | 1/2008 | Maeda |
| 2008/0015767 A1 | 1/2008 | Masuda et al. |
| 2008/0022969 A1 | 1/2008 | Frenz et al. |
| 2008/0059034 A1 | 3/2008 | Lu |
| 2008/0078355 A1 | 4/2008 | Maehara et al. |
| 2008/0091309 A1 | 4/2008 | Walker |
| 2008/0114521 A1 | 5/2008 | Doering |
| 2008/0115761 A1 | 5/2008 | Deguchi et al. |
| 2008/0119984 A1* | 5/2008 | Hrovat ............... B62D 9/00 701/41 |
| 2008/0172155 A1 | 7/2008 | Takamatsu et al. |
| 2008/0178838 A1 | 7/2008 | Ota |
| 2008/0178839 A1 | 7/2008 | Oshima et al. |
| 2008/0178840 A1 | 7/2008 | Oshima et al. |
| 2008/0183353 A1 | 7/2008 | Post et al. |
| 2008/0243334 A1* | 10/2008 | Bujak ............... B60G 17/0195 701/37 |
| 2008/0243336 A1 | 10/2008 | Fitzgibbons |
| 2008/0269989 A1 | 10/2008 | Brenner et al. |
| 2008/0275606 A1 | 11/2008 | Tarasinski et al. |
| 2008/0287256 A1 | 11/2008 | Unno |
| 2008/0300768 A1 | 12/2008 | Hijikata |
| 2009/0008890 A1 | 1/2009 | Woodford |
| 2009/0020966 A1 | 1/2009 | Germain |
| 2009/0037051 A1 | 2/2009 | Shimizu et al. |
| 2009/0071437 A1 | 3/2009 | Samoto et al. |
| 2009/0076699 A1 | 3/2009 | Osaki et al. |
| 2009/0093928 A1 | 4/2009 | Getman et al. |
| 2009/0095252 A1 | 4/2009 | Yamada |
| 2009/0095254 A1 | 4/2009 | Yamada |
| 2009/0096598 A1 | 4/2009 | Tengler et al. |
| 2009/0108546 A1 | 4/2009 | Ohletz et al. |

(56) References Cited

U.S. PATENT DOCUMENTS

| | | |
|---|---|---|
| 2009/0132154 A1 | 5/2009 | Fuwa et al. |
| 2009/0171546 A1 | 7/2009 | Tozuka et al. |
| 2009/0173562 A1 | 7/2009 | Namari et al. |
| 2009/0229568 A1 | 9/2009 | Nakagawa |
| 2009/0234534 A1 | 9/2009 | Stempnik et al. |
| 2009/0240427 A1 | 9/2009 | Siereveld et al. |
| 2009/0243339 A1 | 10/2009 | Orr et al. |
| 2009/0254249 A1 | 10/2009 | Ghoneim et al. |
| 2009/0254259 A1 | 10/2009 | The |
| 2009/0261542 A1 | 10/2009 | McIntyre |
| 2009/0287392 A1 | 11/2009 | Thomas |
| 2009/0301830 A1 | 12/2009 | Kinsman et al. |
| 2009/0308682 A1 | 12/2009 | Ripley et al. |
| 2009/0312147 A1 | 12/2009 | Oshima et al. |
| 2009/0321167 A1 | 12/2009 | Simmons |
| 2010/0012399 A1 | 1/2010 | Hansen |
| 2010/0016120 A1 | 1/2010 | Dickinson et al. |
| 2010/0017059 A1 | 1/2010 | Lu et al. |
| 2010/0017070 A1 | 1/2010 | Doering et al. |
| 2010/0023236 A1 | 1/2010 | Morgan et al. |
| 2010/0057297 A1 | 3/2010 | Itagaki et al. |
| 2010/0059964 A1 | 3/2010 | Morris |
| 2010/0109277 A1 | 5/2010 | Furrer |
| 2010/0113214 A1 | 5/2010 | Krueger et al. |
| 2010/0121529 A1 | 5/2010 | Savaresi et al. |
| 2010/0131131 A1 | 5/2010 | Kamio et al. |
| 2010/0138142 A1 | 6/2010 | Pease |
| 2010/0140009 A1 | 6/2010 | Kamen et al. |
| 2010/0145579 A1 | 6/2010 | O'Brien |
| 2010/0145581 A1 | 6/2010 | Hou |
| 2010/0145595 A1 | 6/2010 | Bellistri et al. |
| 2010/0152969 A1 | 6/2010 | Li et al. |
| 2010/0181416 A1 | 7/2010 | Sakamoto et al. |
| 2010/0191420 A1 | 7/2010 | Honma et al. |
| 2010/0203933 A1 | 8/2010 | Eyzaguirre et al. |
| 2010/0211261 A1 | 8/2010 | Sasaki et al. |
| 2010/0219004 A1 | 9/2010 | MacKenzie |
| 2010/0230876 A1 | 9/2010 | Inoue et al. |
| 2010/0238129 A1 | 9/2010 | Nakanishi et al. |
| 2010/0252972 A1 | 10/2010 | Cox et al. |
| 2010/0253018 A1 | 10/2010 | Peterson |
| 2010/0259018 A1 | 10/2010 | Honig et al. |
| 2010/0276906 A1 | 11/2010 | Galasso et al. |
| 2010/0282210 A1 | 11/2010 | Itagaki |
| 2010/0301571 A1 | 12/2010 | Van et al. |
| 2011/0022266 A1 | 1/2011 | Ippolito et al. |
| 2011/0025012 A1 | 2/2011 | Nakamura |
| 2011/0035089 A1 | 2/2011 | Hirao et al. |
| 2011/0035105 A1 | 2/2011 | Jolly |
| 2011/0036656 A1 | 2/2011 | Nicoson |
| 2011/0074123 A1 | 3/2011 | Fought et al. |
| 2011/0109060 A1 | 5/2011 | Earle et al. |
| 2011/0121524 A1* | 5/2011 | Kamioka ............... B62B 17/062 |
| | | 280/5.51 |
| 2011/0153158 A1 | 6/2011 | Acocella |
| 2011/0153174 A1 | 6/2011 | Roberge et al. |
| 2011/0166744 A1* | 7/2011 | Lu ........................ B60T 8/1755 |
| | | 701/1 |
| 2011/0186360 A1 | 8/2011 | Brehob et al. |
| 2011/0190972 A1 | 8/2011 | Timmons et al. |
| 2011/0215544 A1 | 9/2011 | Rhodig |
| 2011/0270509 A1 | 11/2011 | Whitney et al. |
| 2011/0297462 A1 | 12/2011 | Grajkowski et al. |
| 2011/0297463 A1 | 12/2011 | Grajkowski et al. |
| 2011/0301824 A1 | 12/2011 | Nelson et al. |
| 2011/0301825 A1 | 12/2011 | Grajkowski et al. |
| 2011/0307155 A1 | 12/2011 | Simard |
| 2012/0017871 A1 | 1/2012 | Matsuda |
| 2012/0018263 A1 | 1/2012 | Marking |
| 2012/0029770 A1 | 2/2012 | Hirao et al. |
| 2012/0053790 A1 | 3/2012 | Oikawa |
| 2012/0053791 A1 | 3/2012 | Harada |
| 2012/0055745 A1 | 3/2012 | Buettner et al. |
| 2012/0065860 A1 | 3/2012 | Isaji et al. |
| 2012/0078470 A1 | 3/2012 | Hirao et al. |
| 2012/0112424 A1* | 5/2012 | Cronquist ............... B62B 17/04 |
| | | 280/5.51 |
| 2012/0119454 A1 | 5/2012 | Di Maria |
| 2012/0136506 A1 | 5/2012 | Takeuchi et al. |
| 2012/0139328 A1 | 6/2012 | Brown et al. |
| 2012/0168268 A1 | 7/2012 | Bruno et al. |
| 2012/0191301 A1 | 7/2012 | Benyo et al. |
| 2012/0191302 A1 | 7/2012 | Sternecker et al. |
| 2012/0222908 A1 | 9/2012 | Mangum |
| 2012/0222927 A1 | 9/2012 | Marking |
| 2012/0247852 A1* | 10/2012 | Fecteau ................. B62M 27/02 |
| | | 180/193 |
| 2012/0247888 A1 | 10/2012 | Chikuma et al. |
| 2012/0253601 A1 | 10/2012 | Ichida et al. |
| 2012/0265402 A1 | 10/2012 | Post et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0092468 A1 | 4/2013 | Nelson et al. |
| 2013/0096784 A1 | 4/2013 | Kohler et al. |
| 2013/0096785 A1 | 4/2013 | Kohler et al. |
| 2013/0096793 A1 | 4/2013 | Krosschell |
| 2013/0103259 A1 | 4/2013 | Eng et al. |
| 2013/0124045 A1 | 5/2013 | Suzuki et al. |
| 2013/0158799 A1 | 6/2013 | Kamimura |
| 2013/0161921 A1 | 6/2013 | Cheng et al. |
| 2013/0173119 A1 | 7/2013 | Izawa |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0253770 A1 | 9/2013 | Nishikawa et al. |
| 2013/0261893 A1 | 10/2013 | Yang |
| 2013/0270020 A1* | 10/2013 | Gagnon ................. B62M 27/02 |
| | | 180/193 |
| 2013/0304319 A1 | 11/2013 | Daniels |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0012467 A1 | 1/2014 | Knox et al. |
| 2014/0038755 A1 | 2/2014 | Ijichi et al. |
| 2014/0046539 A1 | 2/2014 | Wijffels et al. |
| 2014/0058606 A1 | 2/2014 | Hilton |
| 2014/0095022 A1 | 4/2014 | Cashman et al. |
| 2014/0125018 A1* | 5/2014 | Brady ................... B60G 17/016 |
| | | 280/5.519 |
| 2014/0125027 A1 | 5/2014 | Rhodig |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0232082 A1 | 8/2014 | Oshita et al. |
| 2014/0239602 A1 | 8/2014 | Blankenship et al. |
| 2014/0316653 A1* | 10/2014 | Kikuchi ............... B60W 10/184 |
| | | 701/38 |
| 2014/0353933 A1 | 12/2014 | Hawksworth et al. |
| 2014/0358373 A1* | 12/2014 | Kikuchi ............... B60G 17/0185 |
| | | 701/38 |
| 2015/0039199 A1 | 2/2015 | Kikuchi |
| 2015/0046034 A1 | 2/2015 | Kikuchi |
| 2015/0057885 A1* | 2/2015 | Brady ................... B60G 17/08 |
| | | 701/37 |
| 2015/0081170 A1* | 3/2015 | Kikuchi ................. B60G 17/06 |
| | | 701/37 |
| 2015/0081171 A1 | 3/2015 | Ericksen et al. |
| 2015/0084290 A1 | 3/2015 | Norton et al. |

(56) References Cited

U.S. PATENT DOCUMENTS

| | | |
|---|---|---|
| 2015/0091269 A1 | 4/2015 | Yleva |
| 2015/0108732 A1 | 4/2015 | Luttinen et al. |
| 2015/0217778 A1 | 8/2015 | Fairgrieve et al. |
| 2015/0329141 A1 | 11/2015 | Preijert |
| 2016/0059660 A1 | 3/2016 | Brady et al. |
| 2016/0082802 A1 | 3/2016 | Izak |
| 2016/0107498 A1 | 4/2016 | Yamazaki |
| 2016/0121689 A1 | 5/2016 | Park et al. |
| 2016/0121905 A1 | 5/2016 | Gillingham et al. |
| 2016/0121924 A1 | 5/2016 | Norstad |
| 2016/0153516 A1 | 6/2016 | Marking |
| 2016/0200164 A1 | 7/2016 | Tabata et al. |
| 2016/0214455 A1 | 7/2016 | Reul et al. |
| 2016/0236528 A1 | 8/2016 | Sunahiro |
| 2016/0280331 A1 | 9/2016 | Mangum |
| 2016/0347137 A1 | 12/2016 | Despres-Nadeau et al. |
| 2016/0347142 A1 | 12/2016 | Seong et al. |
| 2017/0008363 A1 | 1/2017 | Ericksen et al. |
| 2017/0043778 A1 | 2/2017 | Kelly |
| 2017/0087950 A1 | 3/2017 | Brady et al. |
| 2017/0129298 A1 | 5/2017 | Lu et al. |
| 2017/0129301 A1 | 5/2017 | Harvey |
| 2017/0129390 A1 | 5/2017 | Akaza et al. |
| 2017/0313152 A1 | 11/2017 | Kang |
| 2017/0321729 A1 | 11/2017 | Melcher |
| 2018/0001729 A1 | 1/2018 | Goffer et al. |
| 2018/0009443 A1 | 1/2018 | Norstad |
| 2018/0126817 A1 | 5/2018 | Russell et al. |
| 2018/0141543 A1 | 5/2018 | Krosschell et al. |
| 2018/0264902 A1 | 9/2018 | Schroeder et al. |
| 2018/0265062 A1 | 9/2018 | Bowers et al. |
| 2018/0297435 A1 | 10/2018 | Brady et al. |
| 2018/0339566 A1 | 11/2018 | Ericksen et al. |
| 2018/0354336 A1 | 12/2018 | Oakden-Graus et al. |
| 2018/0361853 A1 | 12/2018 | Grajkowski et al. |
| 2019/0100071 A1 | 4/2019 | Tsiaras et al. |
| 2019/0118604 A1 | 4/2019 | Suplin et al. |
| 2019/0118898 A1 | 4/2019 | Ericksen et al. |
| 2019/0217894 A1 | 7/2019 | Upah et al. |
| 2019/0389478 A1 | 12/2019 | Norstad |
| 2020/0016953 A1 | 1/2020 | Oakden-Graus et al. |
| 2020/0096075 A1 | 3/2020 | Lindblad |
| 2020/0156430 A1 | 5/2020 | Oakden-Graus et al. |
| 2020/0223279 A1 | 7/2020 | McKeefery |
| 2020/0238781 A1 | 7/2020 | Hadi |
| 2020/0269648 A1 | 8/2020 | Halper |
| 2020/0282786 A1 | 9/2020 | Lorenz et al. |
| 2021/0031579 A1 | 2/2021 | Booth et al. |
| 2021/0031713 A1 | 2/2021 | Kotrla et al. |
| 2021/0070124 A1 | 3/2021 | Brady et al. |
| 2021/0070125 A1 | 3/2021 | Brady et al. |
| 2021/0070126 A1 | 3/2021 | Brady et al. |
| 2021/0086578 A1 | 3/2021 | Brady et al. |
| 2021/0088100 A1 | 3/2021 | Woelfel |
| 2021/0102596 A1 | 4/2021 | Malmborg et al. |
| 2021/0108696 A1 | 4/2021 | Connor |
| 2021/0162830 A1 | 6/2021 | Graus et al. |
| 2021/0162833 A1 | 6/2021 | Graus et al. |
| 2021/0206263 A1 | 7/2021 | Grajkowski et al. |
| 2021/0229519 A1 | 7/2021 | Tsiaras et al. |
| 2021/0268860 A1 | 9/2021 | Randall |
| 2021/0300140 A1 | 9/2021 | Ericksen et al. |
| 2021/0300141 A1 | 9/2021 | De Grammont et al. |
| 2021/0316716 A1 | 10/2021 | Krosschell et al. |
| 2021/0362806 A1 | 11/2021 | Hedlund et al. |
| 2021/0379957 A1 | 12/2021 | Tabata et al. |
| 2021/0402837 A1 | 12/2021 | Azuma |
| 2022/0009304 A1 | 1/2022 | Leclerc |
| 2022/0016949 A1 | 1/2022 | Graus et al. |
| 2022/0032708 A1 | 2/2022 | Tabata et al. |
| 2022/0041029 A1 | 2/2022 | Randall et al. |
| 2022/0056976 A1 | 2/2022 | Anderson |
| 2022/0080796 A1 | 3/2022 | Dong et al. |
| 2022/0088988 A1 | 3/2022 | Menden et al. |
| 2022/0134830 A1 | 5/2022 | Voelkel et al. |
| 2022/0227191 A1 | 7/2022 | Dong et al. |
| 2022/0266844 A1 | 8/2022 | Norstad et al. |
| 2022/0288990 A1 | 9/2022 | Smith |
| 2022/0324282 A1 | 10/2022 | Brady et al. |
| 2022/0332159 A1 | 10/2022 | Corsico |
| 2022/0388362 A1 | 12/2022 | Graus et al. |
| 2022/0397194 A1 | 12/2022 | Kohler et al. |
| 2023/0013665 A1 | 1/2023 | Gagnon et al. |
| 2023/0079941 A1 | 3/2023 | Graus et al. |
| 2024/0123972 A1 | 4/2024 | Krosschell et al. |
| 2024/0131892 A1 | 4/2024 | Graus et al. |
| 2024/0190448 A1 | 6/2024 | Norstad et al. |
| 2024/0262151 A1 | 8/2024 | Graus et al. |

FOREIGN PATENT DOCUMENTS

| | | |
|---|---|---|
| CA | 2260292 A1 | 7/2000 |
| CA | 2851626 A1 | 4/2013 |
| CA | 2963790 A1 | 4/2016 |
| CA | 2965309 A1 | 5/2016 |
| CA | 3018906 A1 | 4/2019 |
| CN | 1129646 A | 8/1996 |
| CN | 2255379 Y | 6/1997 |
| CN | 2544987 Y | 4/2003 |
| CN | 1660615 A | 8/2005 |
| CN | 1664337 A | 9/2005 |
| CN | 1746803 A | 3/2006 |
| CN | 1749048 A | 3/2006 |
| CN | 1810530 A | 8/2006 |
| CN | 101088829 A | 12/2007 |
| CN | 101417596 A | 4/2009 |
| CN | 101522444 A | 9/2009 |
| CN | 101549626 A | 10/2009 |
| CN | 101868363 A | 10/2010 |
| CN | 201723635 U | 1/2011 |
| CN | 102069813 A | 5/2011 |
| CN | 102168732 A | 8/2011 |
| CN | 201914049 U | 8/2011 |
| CN | 202040257 U | 11/2011 |
| CN | 102616104 A | 8/2012 |
| CN | 102627063 A | 8/2012 |
| CN | 102678808 A | 9/2012 |
| CN | 202449059 U | 9/2012 |
| CN | 102729760 A | 10/2012 |
| CN | 202468817 U | 10/2012 |
| CN | 102840265 A | 12/2012 |
| CN | 103079934 A | 5/2013 |
| CN | 103303088 A | 9/2013 |
| CN | 103318184 A | 9/2013 |
| CN | 103507588 A | 1/2014 |
| CN | 104755348 A | 7/2015 |
| CN | 104768782 A | 7/2015 |
| CN | 105564437 A | 5/2016 |
| CN | 106183688 A | 12/2016 |
| CN | 106218343 A | 12/2016 |
| CN | 106794736 A | 5/2017 |
| CN | 103857576 B | 8/2017 |
| CN | 107406094 A | 11/2017 |
| CN | 107521449 A | 12/2017 |
| CN | 107521499 A | 12/2017 |
| CN | 109203900 A | 1/2019 |
| CN | 110121438 A | 8/2019 |
| CN | 110691705 A | 1/2020 |
| DE | 3705520 A1 | 9/1988 |
| DE | 3811541 A1 | 10/1988 |
| DE | 4017255 A1 | 12/1990 |
| DE | 4323589 A1 | 1/1994 |
| DE | 4328551 A1 | 3/1994 |
| DE | 19508302 A1 | 9/1996 |
| DE | 19922745 A1 | 12/2000 |
| DE | 60029553 T2 | 7/2007 |
| DE | 102010020544 A1 | 1/2011 |
| DE | 102012101278 A1 | 8/2013 |
| EP | 0361726 A2 | 4/1990 |
| EP | 0398804 A1 | 11/1990 |
| EP | 0403803 A1 | 12/1990 |
| EP | 0544108 A1 | 6/1993 |
| EP | 0546295 A1 | 6/1993 |
| EP | 0405123 | 10/1993 |

(56) References Cited

FOREIGN PATENT DOCUMENTS

| | | |
|---|---|---|
| EP | 0473766 | 2/1994 |
| EP | 0691226 A1 | 1/1996 |
| EP | 0745965 A1 | 12/1996 |
| EP | 0829383 A2 | 3/1998 |
| EP | 0953470 A2 | 11/1999 |
| EP | 1005006 A2 | 5/2000 |
| EP | 1022169 A2 | 7/2000 |
| EP | 1172239 A2 | 1/2002 |
| EP | 1219475 A1 | 7/2002 |
| EP | 1238833 A1 | 9/2002 |
| EP | 1258706 A2 | 11/2002 |
| EP | 1355209 A1 | 10/2003 |
| EP | 1449688 A2 | 8/2004 |
| EP | 1481876 A1 | 12/2004 |
| EP | 1164897 | 2/2005 |
| EP | 2123933 A2 | 11/2009 |
| EP | 2216191 A1 | 8/2010 |
| EP | 2268496 A1 | 1/2011 |
| EP | 2397349 A1 | 12/2011 |
| EP | 2517904 A1 | 10/2012 |
| EP | 3150454 A1 | 4/2017 |
| EP | 3204248 A1 | 8/2017 |
| EP | 3461663 A1 | 4/2019 |
| FR | 2935642 | 3/2010 |
| GB | 2233939 A | 1/1991 |
| GB | 2234211 A | 1/1991 |
| GB | 2259063 A | 3/1993 |
| GB | 2262491 A | 6/1993 |
| GB | 2329728 A | 3/1999 |
| GB | 2377415 A | 1/2003 |
| GB | 2412448 A | 9/2005 |
| GB | 2441348 A | 3/2008 |
| GB | 2445291 A | 7/2008 |
| GB | 2552237 A | 1/2018 |
| IN | 20130233813 | 8/2014 |
| JP | 01-208212 | 8/1989 |
| JP | 02-155815 A | 6/1990 |
| JP | 03-137209 A | 6/1991 |
| JP | 04-368211 A | 12/1992 |
| JP | 05-178055 A | 7/1993 |
| JP | 06-156036 A | 6/1994 |
| JP | 07-117433 A | 5/1995 |
| JP | 07-186668 A | 7/1995 |
| JP | 08-332940 A | 12/1996 |
| JP | 09-203640 A | 8/1997 |
| JP | 2898949 B2 | 6/1999 |
| JP | 2956221 B2 | 10/1999 |
| JP | 11-321754 A | 11/1999 |
| JP | 3087539 B2 | 9/2000 |
| JP | 2001-018623 A | 1/2001 |
| JP | 3137209 B2 | 2/2001 |
| JP | 2001-121939 A | 5/2001 |
| JP | 2001-233228 A | 8/2001 |
| JP | 2001-278089 A | 10/2001 |
| JP | 2002-219921 A | 8/2002 |
| JP | 2003-328806 A | 11/2003 |
| JP | 2008-273246 A | 11/2008 |
| JP | 2009-035220 A | 2/2009 |
| JP | 2009-160964 A | 7/2009 |
| JP | 4584510 B2 | 11/2010 |
| JP | 2011-126405 A | 6/2011 |
| JP | 5149443 B2 | 2/2013 |
| JP | 2013-173490 A | 9/2013 |
| JP | 2013-189109 A | 9/2013 |
| KR | 10-2008-0090833 A | 10/2008 |
| TW | M299089 U | 10/2006 |
| WO | 92/10693 A1 | 6/1992 |
| WO | 96/05975 A1 | 2/1996 |
| WO | 97/27388 A1 | 7/1997 |
| WO | 99/59860 A1 | 11/1999 |
| WO | 00/53057 A1 | 9/2000 |
| WO | 02/20318 A1 | 3/2002 |
| WO | 2004/009433 A1 | 1/2004 |
| WO | 2004/098941 A1 | 11/2004 |
| WO | 2009/008816 A1 | 1/2009 |
| WO | 2009/133000 A1 | 11/2009 |
| WO | 2012/028923 A1 | 3/2012 |
| WO | 2015/004676 A1 | 1/2015 |
| WO | 2016/057555 A1 | 4/2016 |
| WO | 2016/069405 A2 | 5/2016 |
| WO | 2018/189712 A1 | 10/2018 |
| WO | 2020/089837 A1 | 5/2020 |

OTHER PUBLICATIONS

Ackermann et al., "Robust steering control for active rollover avoidance of vehicles with elevated center of gravity", Jul. 1998, pp. 1-6.
Article 34 Amendment, issued by the European Patent Office, dated Aug. 29, 2016, for related International patent application No. PCT/US2015/057132; 34 pages.
Bhattacharyya et al., "An Approach to Rollover Stability in Vehicles Using Suspension Relative Position Sensors and Lateral Acceleration Sensors", Dec. 2005, 100 pages.
Compare: Three Selectable Terrain Management Systems, Independent Land Rover News Blog, retrieved from https://web.archive.org/web/20120611082023/ . . . ; archive date Jun. 11, 2012; 4 pages.
EDFC Active Adjust Damping Force Instantly according to G-Force & Speed, TEIN, retrieved from https://web.archive.org/web/20160515190809/ . . . ; archive date May 15, 2016; 22 pages.
English translation of Examination Report issued by the State Intellectual Property Office of People's Republic of China, dated Jun. 1, 2015, for Chinese Patent Application No. 201180037804.3; 13 pages.
European Search Report issued by the European Patent Office, dated Feb. 10, 2017, for corresponding European U.S. Appl. No. 16/193,006; 7 pages.
Examination Report issued by the European Patent Office, dated Aug. 1, 2016, for European Patent Application No. 11724931.8; 5 pages.
Examination Report issued by the State Intellectual Property Office of People's Republic of China, dated Feb. 3, 2016, for Chinese Patent Application No. 201180037804.3; 14 pages.
Examination Report No. 1 issued by the Australian Government IP Australia, dated Apr. 15, 2014, for Australian Patent Application No. 2011261248; 5 pages.
Examination Report No. 1 issued by the Australian Government IP Australia, dated Aug. 10, 2018, for Australian Patent Application No. 2015328248; 2 pages.
Examination Report No. 1 issued by the Australian Government IP Australia, dated Jan. 12, 2017, for corresponding Australian patent application No. 2015271880; 6 pages.
Examination Report No. 2 issued by the Australian Government IP Australia, dated Jun. 29, 2017, for Australian Patent Application No. 2015271880; 8 pages.
Examination Report No. 2 issued by the Australian Government IP Australia, dated May 29, 2015, for Australian Patent Application No. 2011261248; 8 pages.
Examination Report No. 3 issued by the Australian Government IP Australia, dated Dec. 1, 2017, for Australian Patent Application No. 2015271880; 7 pages.
Extended European Search Report issued by the European Patent Office, dated Sep. 7, 2018, for European Patent Application No. 18183050.6; 7 pages.
First drive: Ferrari's easy-drive supercar, GoAuto.com.au, Feb. 16, 2010; 4 pages.
Gangadurai et al.; Development of control strategy for optimal control of a continuously variable transmission operating in combination with a throttle controlled engine; SAE International; Oct. 12, 2005.
Hac et al., "Improvements in vehicle handling through integrated control of chassis systems", Int. J. of Vehicle Autonomous Systems(IJVAS), vol. 1, No. 1, 2002, pp. 83-110.
Huang et al., "Nonlinear Active Suspension Control Design Applied to a Half-Car Model", Proceedings of the 2004 IEEE International Conference on Networking, Mar. 21-23, 2004, pp. 719-724.

(56) References Cited

OTHER PUBLICATIONS

Ingalls, Jake; Facebook post https://www.facebook.com/groups/877984048905836/permalink/110447996625624- 2; Sep. 11, 2016; 1 page.

International Preliminary Amendment issued by the International Bureau of WIPO, dated May 21, 2019, for International Patent Application No. PCT/US2017/062303; 22 pages.

International Preliminary Report on Patentability in PCT Application Serial No. PCT/US15/57132, issued Jan. 30, 2017 (6 pages).

International Preliminary Report on Patentability issued by the European Patent Office, dated Apr. 11, 2017, for International Patent Application No. PCT/US2015/054296; 7 pages.

International Preliminary Report on Patentability issued by the International Bureau of WIPO, dated Dec. 10, 2019, for International Patent Application No. PCT/US2018/036383; 8 pages.

International Preliminary Report on Patentability issued by the International Bureau of WIPO, dated May 12, 2015, for International Application No. PCT/US2013/068937; 7 pages.

International Preliminary Report on Patentability issued by the International Bureau of WIPO, Dec. 4, 2012, for International Application No. PCT/US2011/039165; 9 pages.

International Preliminary Report on Patentability issued by the International Searching Authority, dated Jun. 3, 2021, or International Patent Application No. PCT/IB2019/060089; 21 pages.

International Preliminary Report on Patentability received for PCT Patent Application No. PCT/US2017/062303, mailed on May 31, 2019, 23 pages.

International Preliminary Report on Patentability received for PCT Patent Application No. PCT/US2021/033199, mailed on Dec. 1, 2022, 11 pages.

International Search Report and Written Opinion of the International Searching Authority for International Application No. PCT/US2011/39165, dated Jan. 3, 2012; 15 pages.

International Search Report and Written Opinion of the International Searching Authority, dated Aug. 31, 2018, for International Patent Application No. PCT/US2018/036383; 12 pages.

International Search Report and Written Opinion received for PCT Patent Application No. PCT/IB2019/060089, mailed on May 29, 2020, 24 pages.

International Search Report and Written Opinion received for PCT Patent Application No. PCT/US2013/068937, mailed on Feb. 26, 2014, 10 pages.

International Search Report and Written Opinion received for PCT Patent Application No. PCT/US2015/054296, mailed on Dec. 18, 2015, 9 pages.

International Search Report and Written Opinion received for PCT Patent Application No. PCT/US2015/057132, mailed on May 13, 2016, 17 pages.

International Search Report and Written Opinion received for PCT Patent Application No. PCT/US2021/033199, mailed on Aug. 23, 2021, 14 pages.

International Search Report and Written Opinion received for PCT Patent Application No. PCT/US2021/042230, mailed on Dec. 17, 2021, 4 pages.

International Search Report issued by the International Searching Authority, dated Jun. 7, 2018, for related International Patent Application No. PCT/US2017/062303; 7 pages.

Machine translation of DE 3705520 A1 from espacenet.com November (Year: 2022).

McKay et al., Delphi Electronic Throttle Control Systems for Model Year 2000; Driver Features, System Security, and OEM Benefits. ETC for the Mass Market, Electronic Engine Controls 2000: Controls (SP-1500), SAE 2000 World Congress, Detroit, MI, Mar. 6-9, 2000, 13 pages.

Office Action issued by the Canadian Intellectual Property Office, dated Apr. 21, 2017, for corresponding Canadian patent application No. 2,801,334; 3 pages.

Office Action issued by the Canadian Intellectual Property Office, dated Jul. 26, 2019, for Canadian Patent Application No. 2,963,790; 3 pages.

Office Action issued by the Canadian Intellectual Property Office, dated Jun. 22, 2021, for Canadian Patent Application No. 3,043,481; 3 pages.

Office Action issued by the Canadian Intellectual Property Office, dated May 10, 2021, for Canadian Patent Application No. 2,890,996; 3 pages.

Office Action issued by the Canadian Intellectual Property Office, dated Oct. 1, 2019, for Canadian Patent Application No. 2,965,309; 8 pages.

Office Action issued by the Mexican Patent Office, dated Jun. 25, 2014, for corresponding Mexican patent application No. MX/a/2012/014069; 2 pages.

Scott Tsuneishi, "2005 Subaru WRX Sti—Blitz Throttle Controller," Oct. 1, 2008, Super Street Online, <http://www.superstreetonline.com/how-to/engine/turp-0810-2005-subam-wrx-sti-blitz-throttle-controller>; see appended screenshot retrived from the Internet Nov. 30, 2015; 11 pages.

Throttle Controller, Blitz Power USA, <http://www.blitzpowerusa.com/products/throcon/throcon.html>.; earliest known archive via Internet Archive Wayback Machine Sep. 14, 2009: <http://web.archive.Org/web/20090914102957/http://www.blitzpowerusa.com/products/throcon/throcon.html>.; see appended screenshot.

International Preliminary Report on Patentability received for PCT Patent Application No. PCT/US2021/042230, mailed on Jan. 26, 2023, 10 pages.

Trebi-Ollennu et al., Adaptive Fuzzy Throttle Control of an All Terrain Vehicle, 2001, Abstract.

Unno et al.; Development of Electronically Controlled DVT Focusing on Rider's Intention of Acceleration and Deceleration; SAE International; Oct. 30, 2007.

Written Opinion issued by the International Searching Authority, dated Jun. 7, 2018, for related International Patent Application No. PCT/US2017/062303; 22 pages.

\* cited by examiner

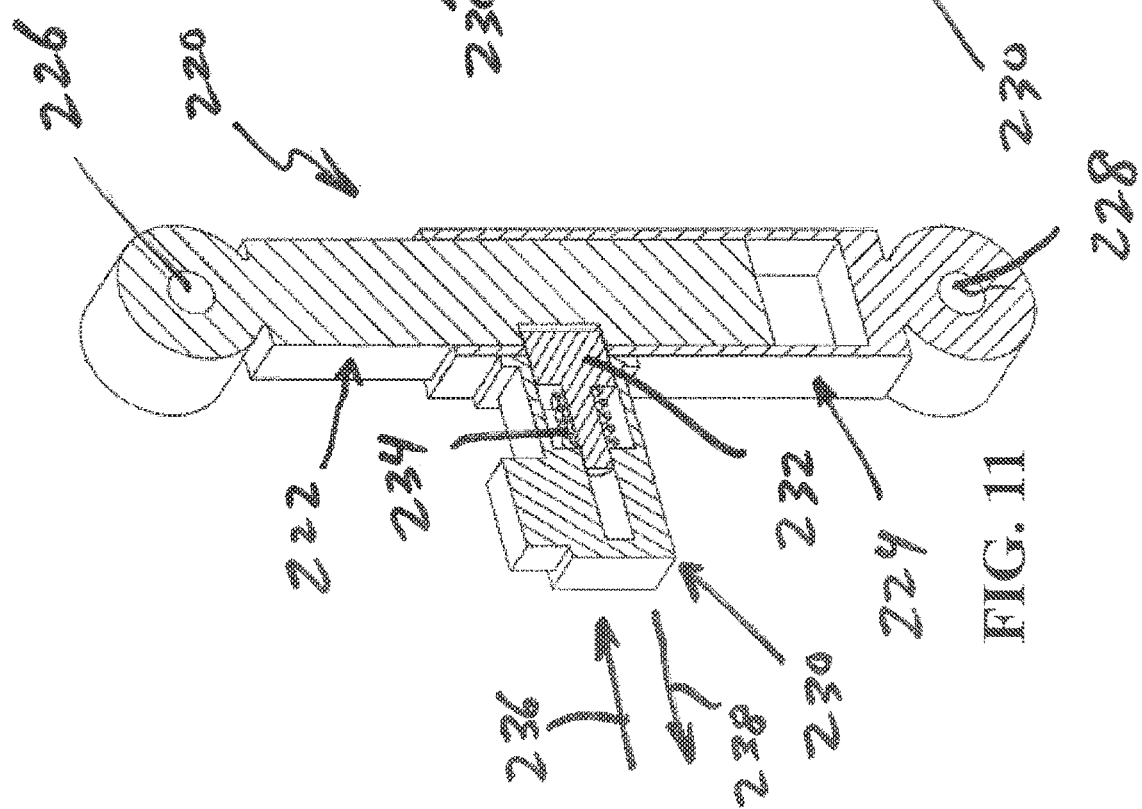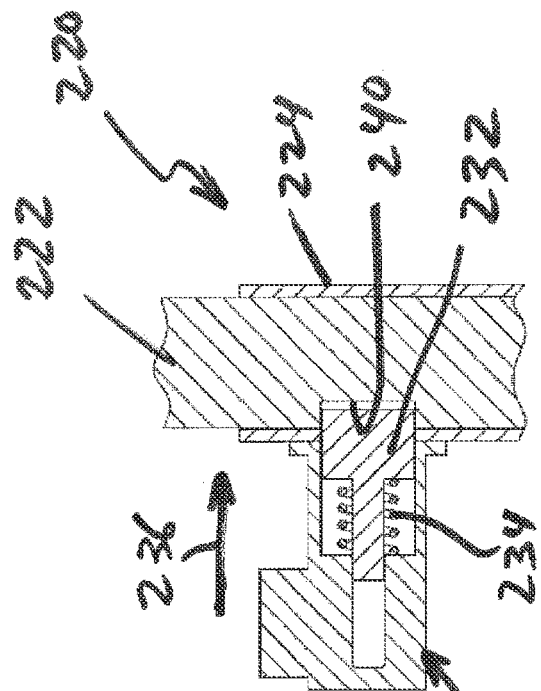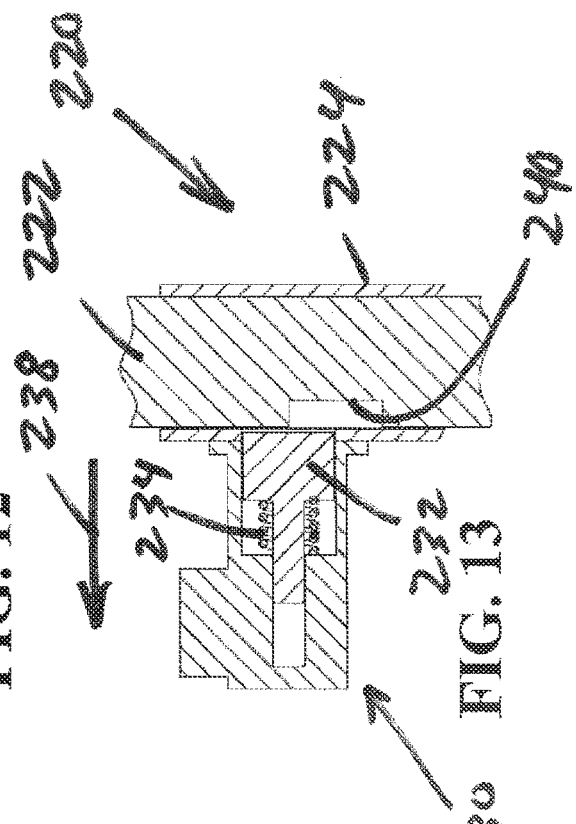

VEHICLE HAVING SUSPENSION WITH CONTINUOUS DAMPING CONTROL

CROSS REFERENCE TO RELATED APPLICATIONS

This application is a continuation of U.S. application Ser. No. 17/850,401, filed Jun. 27, 2022, which is a continuation of U.S. application Ser. No. 17/100,451, filed Nov. 20, 2020, now U.S. Pat. No. 11,400,787, which is a continuation of U.S. application Ser. No. 16/013,210, now U.S. Pat. No. 11,124,036, filed Jun. 20, 2018, which is a continuation of U.S. application Ser. No. 15/377,640, now U.S. Pat. No. 10,005,335, filed Dec. 13, 2016, which is a continuation of U.S. application Ser. No. 14/935,184, now U.S. Pat. No. 9,527,362, filed Nov. 6, 2015, which is a continuation of U.S. application Ser. No. 14/507,355, now U.S. Pat. No. 9,205,717, filed Oct. 6, 2014, which is a continuation-in-part of U.S. application Ser. No. 14/074,340, now U.S. Pat. No. 9,662,954, filed on Nov. 7, 2013, which claims the benefit of U.S. Application Ser. No. 61/723,623, filed on Nov. 7, 2012, the disclosures of which are expressly incorporated herein by reference.

BACKGROUND AND SUMMARY OF THE DISCLOSURE

The present disclosure relates to improved suspension for a vehicle having continuous "on-the-go" damping control for shock absorbers.

Currently some off-road vehicles include adjustable shock absorbers. These adjustments include spring preload, high and low speed compression damping and/or rebound damping. In order to make these adjustments, the vehicle is stopped and the operator makes an adjustment at each shock absorber location on the vehicle. A tool is often required for the adjustment. Some on-road automobiles also include adjustable electric shocks along with sensors for active ride control systems. However, these systems are normally controlled by a computer and are focused on vehicle stability instead of ride comfort. The system of the present disclosure allows an operator to make real time "on-the-go" adjustments to the shocks to obtain the most comfortable ride for given terrain and payload scenarios.

Vehicles often have springs (coil, leaf, or air) at each wheel, track, or ski to support a majority of the load. The vehicle of the present disclosure also has electronic shocks controlling the dynamic movement of each wheel, ski, or track. The electronic shocks have a valve that controls the damping force of each shock. This valve may control compression damping only, rebound damping only, or a combination of compression and rebound damping. The valve is connected to a controller having a user interface that is within the driver's reach for adjustment while operating the vehicle. In one embodiment, the controller increases or decreases the damping of the shock absorbers based on user inputs received from an operator. In another embodiment, the controller has several preset damping modes for selection by the operator. The controller is also coupled to sensors on the suspension and chassis to provide an actively controlled damping system.

In an illustrated embodiment of the present disclosure, a damping control method is provided for a vehicle having a suspension located between a plurality of wheels and a vehicle frame, a controller, a plurality of vehicle condition sensors, and a user interface, the suspension including a plurality of adjustable shock absorbers including a front right shock absorber, a front left shock absorber, a rear right shock absorber, and a rear left shock absorber. The damping control method includes receiving with the controller a user input from the user interface to provide a user selected mode of damping operation for the plurality of adjustable shock absorbers during operation of the vehicle; receiving with the controller a plurality of inputs from the plurality of vehicle condition sensors including a brake sensor, a throttle sensor, and a vehicle speed sensor; determining with the controller whether vehicle brakes are actuated based on an input from the brake sensor; determining with the controller a throttle position based on an input from the throttle sensor; and determining with the controller a speed of the vehicle based on an input from the vehicle speed sensor. The illustrative damping control method also includes operating the damping control in a brake condition if the brakes are actuated, wherein in the brake condition the controller adjusts damping characteristics of the plurality of adjustable shock absorbers based on condition modifiers including the user selected mode and the vehicle speed; operating the damping control in a ride condition if the brakes are not actuated and a throttle position is less than a threshold Y, wherein in the ride condition the controller adjusts damping characteristics of the plurality of adjustable shock absorbers based on condition modifiers including the user selected mode and the vehicle speed; operating the damping control in the ride condition if the brakes are not actuated, the throttle position in greater than the threshold Y, and the vehicle speed is greater than a threshold value Z; and operating the damping control in a squat condition if the brakes are not actuated, the throttle position in greater than the threshold Y, and the vehicle speed is less than the threshold value Z, wherein in the squat condition the controller adjusts damping characteristics of the plurality of adjustable shock absorbers based on condition modifiers including the user selected mode, the vehicle speed, and a throttle percentage.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings.

FIG. 11 is a sectional view of a stabilizer bar of the present disclosure which is selectively decoupled under certain vehicle conditions;

FIG. 12 illustrates the stabilizer bar of FIG. 11 with an actuator in a locked position to prevent movement of a piston of the stabilizer bar;

FIG. 13 is a sectional view similar to FIG. 12 illustrating an actuator in an unlocked position disengaged from the piston of the stabilizer bar to permit movement of the piston relative to a cylinder.

Figure 1:
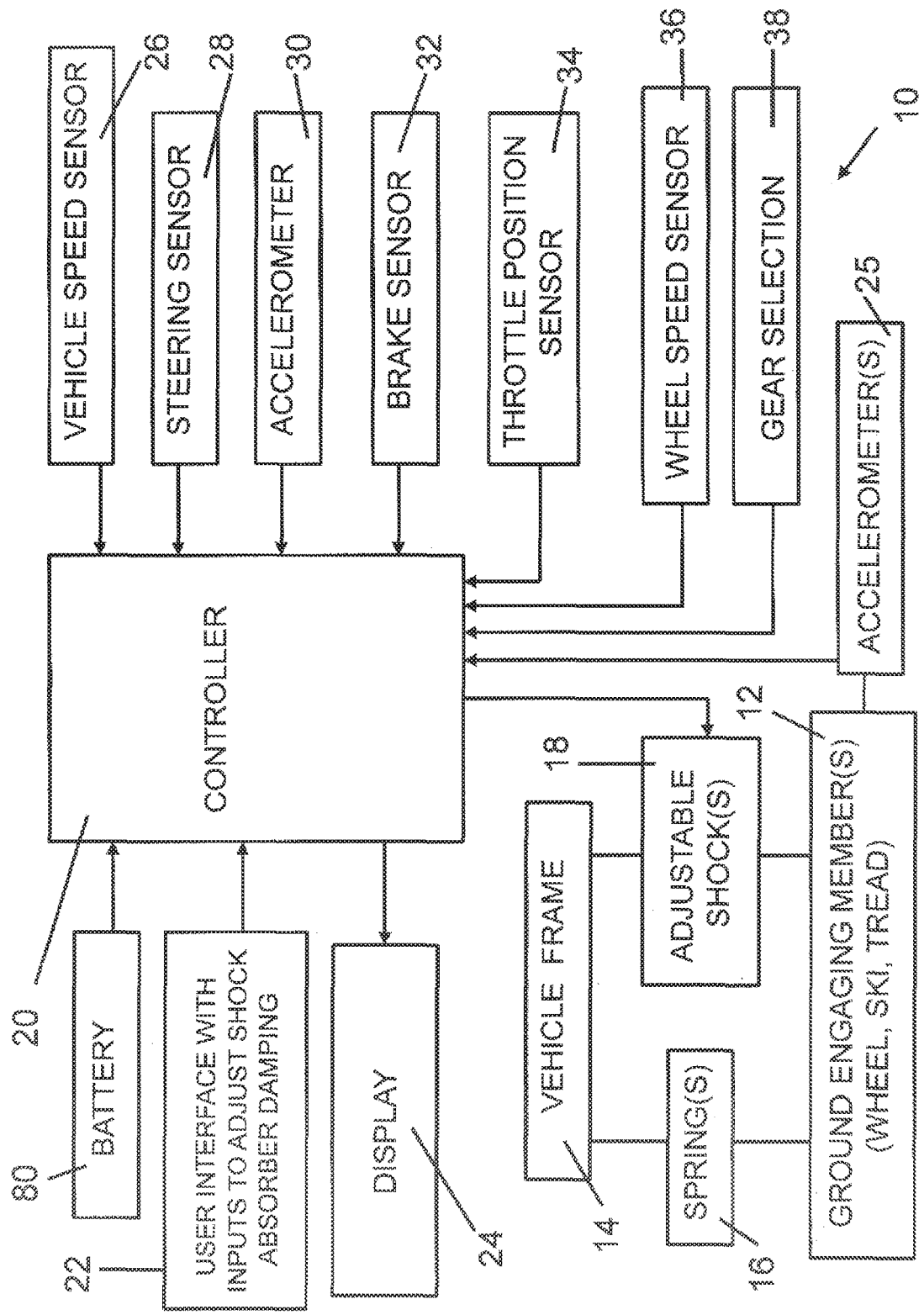
FIG. 1 is a block diagram illustrating components of a vehicle of the present disclosure having a suspension with a plurality of continuous damping control shock absorbers and a plurality of sensors integrated with the continuous damping controller.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It is understood that no limitation of the scope of the invention is thereby intended. The invention includes any alterations and further modifications in the illustrated devices and described methods and further applications of the principles of the invention which would normally occur to one skilled in the art to which the invention relates.

Referring now to FIG. 1, the present disclosure relates to a vehicle 10 having a suspension located between a plurality of ground engaging members 12 and a vehicle frame 14. The ground engaging members 12 include wheels, skis, guide tracks, treads or the like. The suspension typically includes springs 16 and shock absorbers 18 coupled between the ground engaging members 12 and the frame 14. The springs 16 may include, for example, coil springs, leaf springs, air springs or other gas springs. The air or gas springs 16 may be adjustable. See, for example, U.S. Pat. No. 7,950,486 incorporated herein by reference. The springs 16 are often coupled between the vehicle frame 14 and the ground engaging members 12 through an A-arm linkage 70 (See FIG. 5) or other type linkage. Adjustable shock absorbers 18 are also coupled between the ground engaging members 12 and the vehicle frame 14. An illustrating embodiment, a spring 16 and shock 18 are located adjacent each of the ground engaging members 12. In an ATV, for example, four springs 16 and adjustable shocks 18 are provided adjacent each wheel 12. Some manufacturers offer adjustable springs 16 in the form of either air springs or hydraulic preload rings. These adjustable springs 16 allow the operator to adjust the ride height on the go. However, a majority of ride comfort comes from the damping provided by shock absorbers 18.

In an illustrated embodiment, the adjustable shocks 18 are electrically controlled shocks for adjusting damping characteristics of the shocks 18. A controller 20 provides signals to adjust damping of the shocks 18 in a continuous or dynamic manner. The adjustable shocks 18 may be adjusted to provide differing compression damping, rebound damping or both.

In an illustrated embodiment of the present disclosure, a user interface 22 is provided in a location easily accessible to the driver operating the vehicle. Preferably, the user interface 22 is either a separate user interface mounted adjacent the driver's seat on the dashboard or integrated onto a display within the vehicle. User interface 22 includes user inputs to allow the driver or a passenger to manually adjust shock absorber 18 damping during operation of the vehicle based on road conditions that are encountered. In another illustrated embodiment, the user inputs are on a steering wheel, handle bar, or other steering control of the vehicle to facilitate actuation of the damping adjustment. A display 24 is also provided on or next to the user interface 22 or integrated into a dashboard display of the vehicle to display information related to the shock absorber damping settings.

In an illustrated embodiment, the adjustable shock absorbers 18 are model number CDC (continuous damping control) electronically controlled shock absorbers available from ZF Sachs Automotive. See Causemann, Peter; *Automotive Shock Absorbers: Features, Designs, Applications*, ISBN 3-478-93230-0, Verl. Moderne Industrie, Second Edition, 2001, pages 53-63, incorporated by reference herein for a description of the basic operation of the shock absorbers 18 in the illustrated embodiment. It is understood that this description is not limiting and there are other suitable types of shock absorbers available from other manufacturers.

The controller 20 receives user inputs from the user interface 22 and adjusts the damping characteristics of the adjustable shocks 18 accordingly. As discussed below, the user can independently adjust front and rear shock absorbers 18 to adjust the ride characteristics of the vehicle. In certain other embodiments, each of the shocks 18 is independently adjustable so that the damping characteristics of the shocks 18 are changed from one side of the vehicle to another. Side-to-Side adjustment is desirable during sharp turns or other maneuvers in which different damping characteristics for shock absorbers 18 on opposite sides of the vehicle improves the ride. The damping response of the shock absorbers 18 can be changed in a matter of microseconds to provide nearly instantaneous changes in damping for potholes, dips in the road, or other driving conditions.

A plurality of sensors are also coupled to the controller 20. For example, the global change accelerometer 25 is coupled adjacent each ground engaging member 12. The accelerometer provides an output signal coupled to controller 20. The accelerometers 25 provide an output signal indicating movement of the ground engaging members and the suspension components 16 and 18 as the vehicle traverses different terrain.

Additional sensors may include a vehicle speed sensor 26, a steering sensor 28 and a chassis accelerometer 30 all having output signals coupled to the controller 20. Accelerometer 30 is illustratably a three-axis accelerometer located on the chassis to provide an indicating of forces on the vehicle during operation. Additional sensors include a brake sensor 32, a throttle position sensor 34, a wheel speed sensor 36, and a gear selection sensor 38. Each of these sensors has an output signal coupled to the controller 20.

Figure 2:
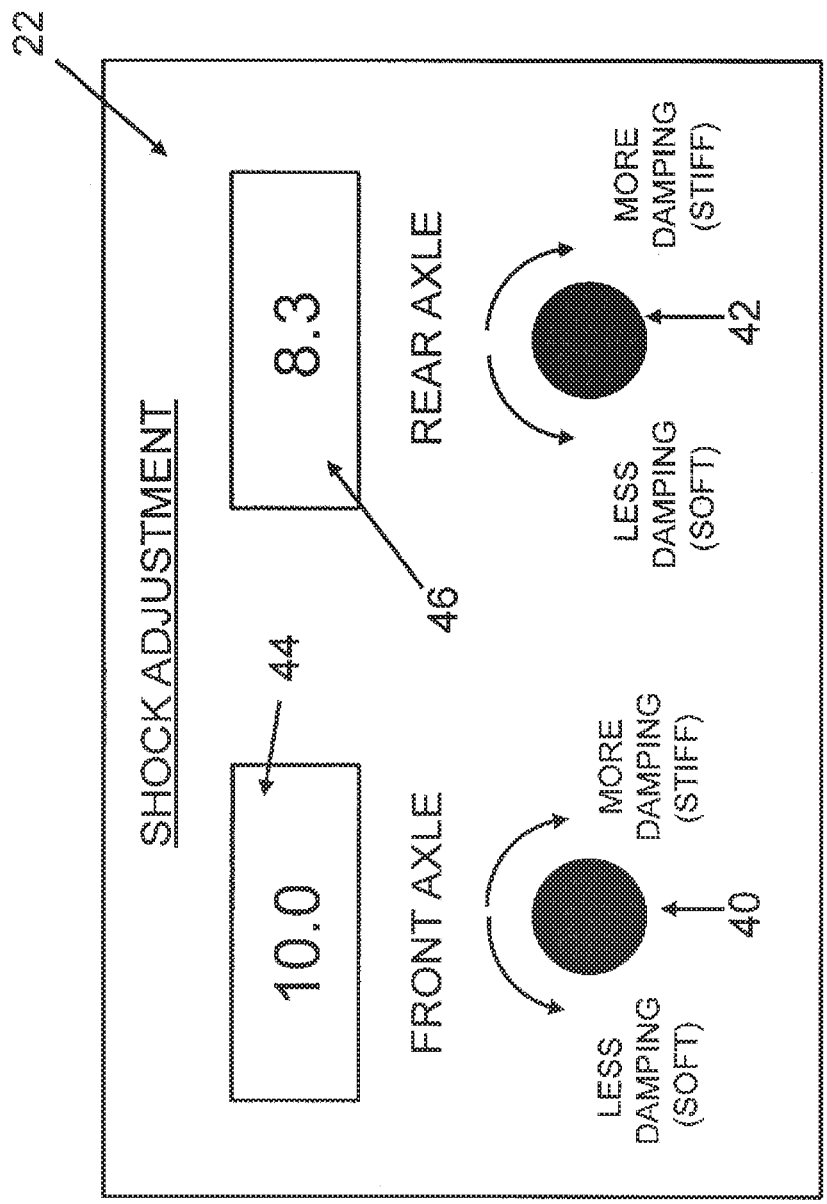
FIG. 2 illustrates an exemplary user interface for controlling damping at a front axle and a rear axle of the vehicle.

In an illustrated embodiment of the present disclosure, the user interface 22 shown in FIG. 2 includes manual user inputs 40 and 42 for adjusting damping of the front and rear axle shock absorbers 18. User interface 22 also includes first and second displays 44 and 46 for displaying the damping level settings of the front shock absorbers and rear shock absorbers, respectively. In operation, the driver or passenger of the vehicle can adjust user inputs 40 and 42 to provide more or less damping to the shock absorbers 18 adjacent the front axle and rear axle of the vehicle. In the illustrated embodiment, user inputs 40 and 42 are rotatable knobs. By rotating knob 40 in a counter clockwise direction, the operator reduces damping of the shock absorbers 18 adjacent the front axle of the vehicle. This provides a softer ride for the front axle. By rotating the knob 40 in a clockwise direction, the operator provides more damping on the shock absorbers 18 adjacent the front axle to provide a stiffer ride. The damping level for front axle is displayed in display 44. The damping level may be indicated by any desired numeric range, such as for example, between 0-10, with 10 being the most stiff and 0 the most soft.

The operator rotates knob 42 in a counter clockwise direction to reduce damping of the shock absorbers 18 adjacent the rear axle. The operator rotates the knob 42 in a clockwise direction to provide more damping to the shock absorbers 18 adjacent the rear axle of the vehicle. The damping level setting of the rear shock absorbers 18 is displayed in display window 46.

Figure 3:
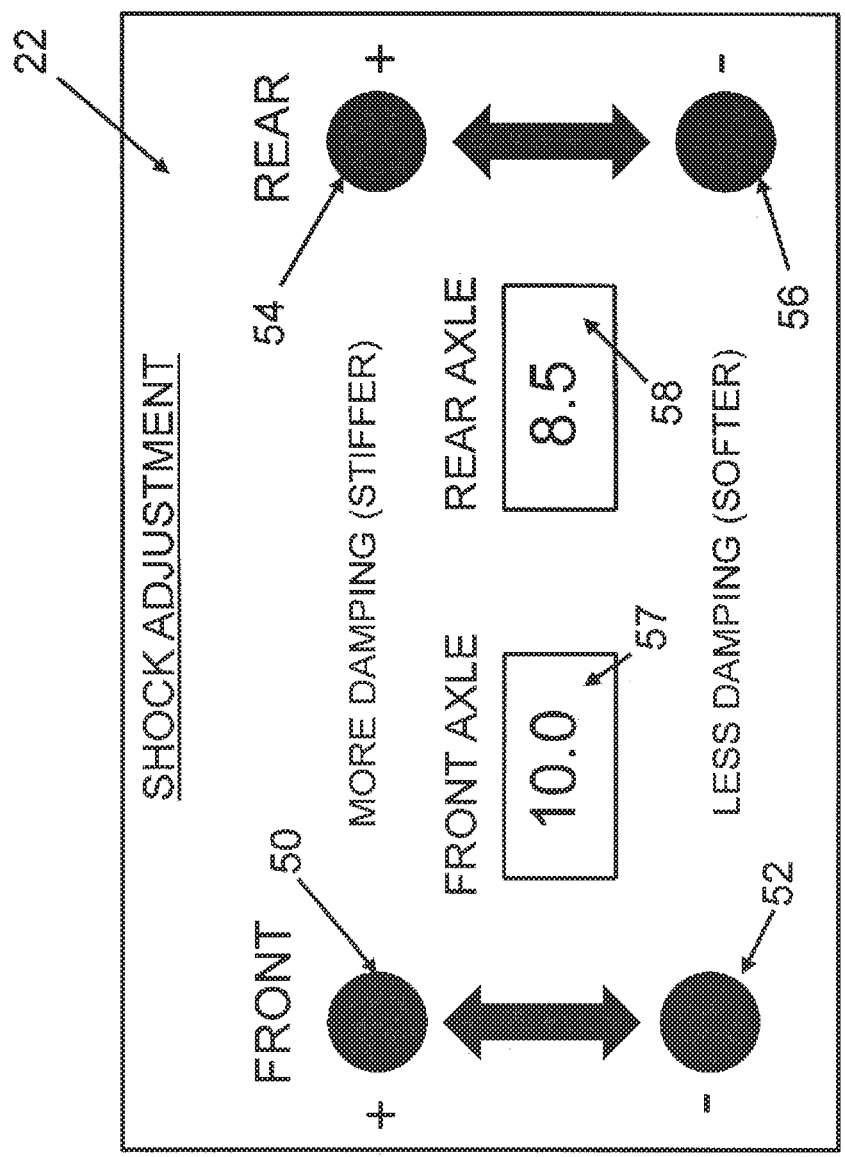
FIG. 3 illustrates another exemplary embodiment of a user interface for continuous damping control of shock absorbers of the vehicle.

Another embodiment of the user interface 22 is illustrated in FIG. 3. In this embodiment, push buttons 50 and 52 are provided for adjusting the damping level of shock absorbers 18 located adjacent the front axle and push buttons 54 and 56 are provided for adjusting the damping of shock absorbers 18 located adjacent rear axle. By pressing button 50, the operator increases the damping of shock absorbers 18 located adjacent the front axle and pressing button 52 reducing the damping of shock absorbers 18 located adjacent front axle. The damping level of shock absorbers 18 adjacent front axle is displayed within display window 57. As discussed above, the input control switches can be located any desired location on the vehicle. For example, in other illustrated embodiments, the user inputs are on a steering wheel, handle bar, or other steering control of the vehicle to facilitate actuation of the damping adjustment.

Similarly, the operator presses button 54 to increase damping of the shock absorbers located adjacent the rear axle. The operator presses button 56 to decrease damping of the shock absorbers located adjacent the rear axle. Display window 58 provides a visual indication of the damping level of shock absorbers 18 adjacent the rear axle. In other embodiments, different user inputs such as touch screen controls, slide controls, or other inputs may be used to adjust the damping level of shock absorbers 18 adjacent the front and rear axles. In other embodiments, different user inputs such as touch screen controls, slide controls, or other inputs may be used to adjust the damping level of shock absorbers 18 adjacent all four wheels at once.

Figure 4:
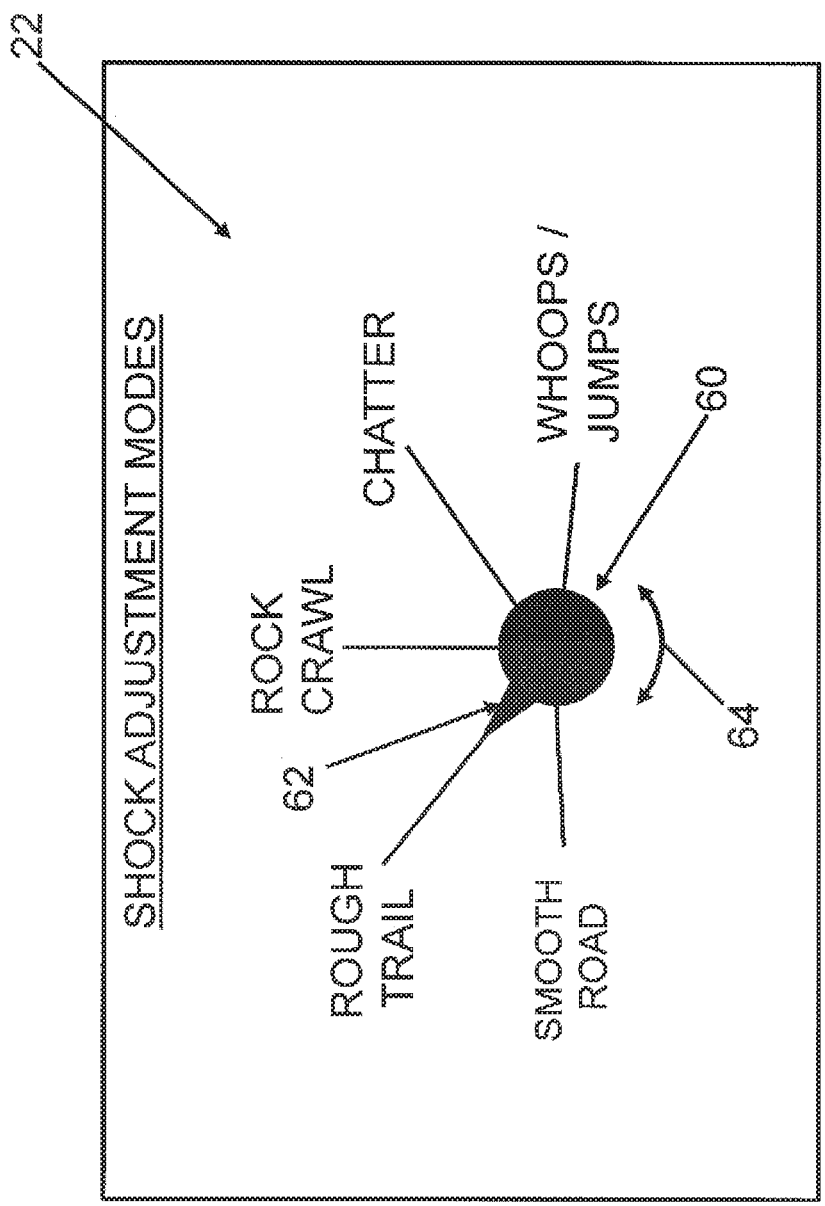
FIG. 4 illustrates yet another user interface for setting various modes of operation of the continuous damping control depending upon the terrain being traversed by the vehicle.

FIG. 4 illustrates yet another embodiment of the present disclosure in which the user interface 22 includes a rotatable knob 60 having a selection indicator 62. Knob 60 is rotatable as illustrated by double-headed arrow 64 to align the indicator 62 with a particular driving condition mode. In the illustrated embodiment, five modes are disclosed including a smooth road mode, a rough trail mode, a rock crawl mode, a chatter mode, and a whoops/jumps mode. Depending on the driving conditions, the operating rotates the control knob 60 to select the particular driving mode. Controller 20 automatically adjusts damping levels of adjustable shocks 18 adjacent front and rear axles of the vehicle based on the particular mode selected.

It is understood that various other modes may be provided including a sport mode, trail mode, or other desired mode. In addition, different modes may be provided for operation in two-wheel drive, four-wheel drive, high and low settings for the vehicle. Illustrative operation modes include:

Smooth Road Mode—Very stiff settings designed to minimize transient vehicle pitch and roll through hard acceleration, braking, and cornering.

Normal Trail Mode—Similar to smooth road mode, but a little bit softer set-up to allow for absorption of rocks, roots, and potholes but still have good cornering, accelerating, and braking performance.

Rock Crawl Mode—This would be the softest setting allowing for maximum wheel articulation for slower speed operation. In one embodiment, the rock crawl mode is linked to vehicle speed sensor 26.

High Speed Harsh Trail (Chatter)—This setting is between Normal Trail Mode and Rock Crawl Mode allowing for high speed control but very plush ride (bottom out easier).

Whoops and Jumps Mode—This mode provides stiffer compression in the dampers but less rebound to keep the tires on the ground as much as possible.

These modes are only examples one skilled in the art would understand there could be many more modes depending on the desired/intended use of the vehicle.

In addition to the driving modes, the damping control may be adjusted based on outputs from the plurality of sensors coupled with the controller 20. For instance, the setting of adjustable shock absorbers 18 may be adjusted based on vehicle speed from speed sensor 26 or outputs from the accelerometers 25 and 30. In vehicles moving slowly, the damping of adjustable shock absorbers 18 is reduced to provide a softer mode for a better ride. As vehicle's speed increases, the shock absorbers 18 are adjusted to a stiffer damping setting. The damping of shock absorbers 18 may also be coupled and controlled by an output from a steering sensor 28. For instance, if the vehicle makes a sharp turn, damping of shock absorbers 18 on the appropriate side of the vehicle may be adjusted instantaneously to improve ride.

The continuous damping control of the present disclosure may be combined with adjustable springs 16. The springs 16 may be a preload adjustment or a continuous dynamic adjustment based on signals from the controller 20.

An output from brake sensor 32 may also be monitored and used by controller 20 to adjust the adjustable shocks 18. For instance, during heavy braking, damping levels of the adjustable shocks 18 adjacent the front axle may be adjusted to reduce "dive" of the vehicle. In an illustrated embodiment, dampers are adjusted to minimize pitch by determining which direction the vehicle is traveling, by sensing an input from the gear selection sensor 38 and then adjusting the damping when the brakes are applied as detected by the brake sensor 32. In an illustrative example, for improved braking feel, the system increases the compression damping for shock absorbers 18 in the front of the vehicle and adds rebound damping for shock absorbers 18 in the rear of the vehicle for a forward traveling vehicle.

In another embodiment, an output from the throttle position sensor is used by controller 20 to adjust the adjustable shock absorbers 18 to adjust or control vehicle squat which occurs when the rear of the vehicle drops or squats during acceleration. For example, controller 20 may stiffen the damping of shock absorbers 18 adjacent rear axle during rapid acceleration of the vehicle. Another embodiment includes driver-selectable modes that control a vehicle's throttle map and damper settings simultaneously. By linking the throttle map and the CDC damper calibrations together, both the throttle (engine) characteristics and the suspension settings simultaneously change when a driver changes operating modes.

In another embodiment, a position sensor is provided adjacent the adjustable shock absorbers 18. The controller 20 uses these position sensors to stiffen the damping of the adjustable shocks 18 near the ends of travel of the adjustable shocks. This provides progressive damping control for the shock absorbers. In one illustrated embodiment, the adjustable shock position sensor is an angle sensor located on an A-arm of the vehicle suspension. In another embodiment, the adjustable shocks include built in position sensors to provide an indication when the shock is near the ends of its stroke.

In another illustrated embodiment, based on gear selection detected by gear selection sensor 38, the system limits the range of adjustment of the shock absorbers 18. For example, the damping adjustment range is larger when the gear selector is in low range compared to high range to keep the loads in the accepted range for both the vehicle and the operator.

Figure 5:
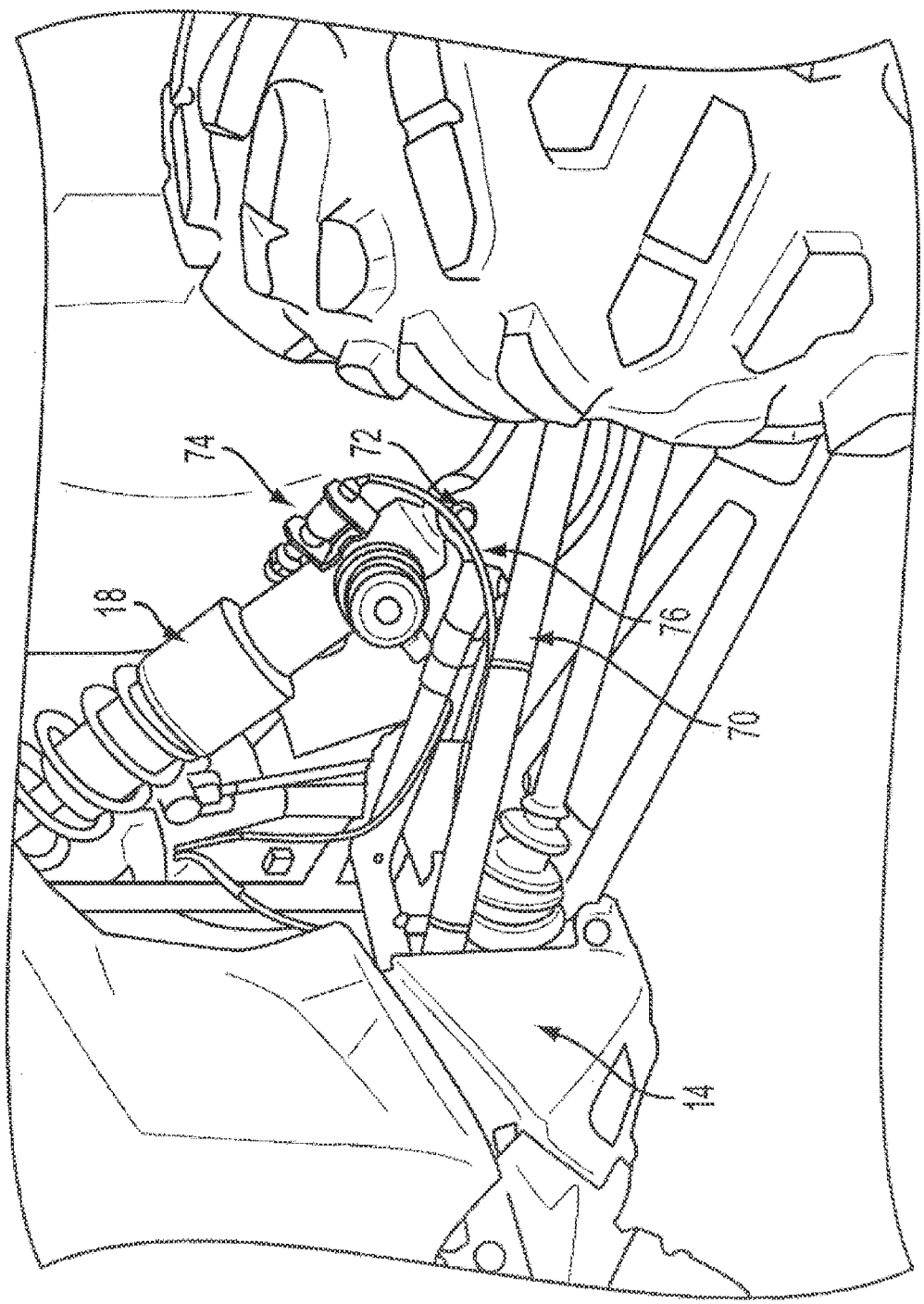
FIG. 5 illustrates an adjustable damping shock absorber coupled to a vehicle suspension.

FIG. 5 illustrates an adjustable shock absorber 18 mounted on an A-arm linkage 70 having a first end coupled to the vehicle frame 14 and a second end coupled to a wheel 12. The adjustable shock absorber 18 includes a first end 72 pivotably coupled to the A-arm 70 and a second end (not shown) pivotably coupled to the frame 14. A damping control activator 74 is coupled to controller 20 by a wire 76.

Demonstration Mode

In an illustrated embodiment of the present disclosure, a battery 80 is coupled to controller 20 as shown in FIG. 1. For operation in a demonstration mode in a showroom, the controller 20, user interface 22 and display 24 are activated using a key in an ignition of the vehicle or a wireless key to place the vehicle in accessory mode. This permits adjustment of the adjustable shock absorbers 18 without starting the vehicle. Therefore, the operation of the continuous damping control features of the present disclosure may be demonstrated to customers in a show room where it is not permitted to start the vehicle due to the enclosed space. This provides an effective tool for demonstrating how quickly the continuous damping control of the present disclosure works to adjust damping of front and rear axles of the vehicle.

As described herein, the system of the present disclosure includes four levels or tiers of operation. In the first tier, the adjustable shock absorbers 18 are adjusted by manual input only using the user interface 22 and described herein. In the second tier of operation, the system is semi-active and uses user inputs from the user interface 22 combined with vehicle sensors discussed above to control the adjustable shock absorbers 18. In the third tier of operation, input accelerometers 25 located adjacent the ground engaging members 12 and a chassis accelerometer 30 are used along with steering sensor 28 and shock absorber stroke position sensors to provide additional inputs for controller 20 to use when adjusting the adjustable shock absorbers 18. In the forth tier of operation, the controller 20 cooperates with a stability control system to adjust the shock absorbers 18 to provide enhanced stability control for the vehicle 10.

In another illustrated embodiment, vehicle loading information is provided to the controller 20 and used to adjust the adjustable shock absorbers 18. For instance, the number of passengers may be used or the amount of cargo may be input in order to provide vehicle loading information. Passenger or cargo sensors may also be provided for automatic inputs to the controller 20. In addition, sensors on the vehicle may detect attachments on the front or rear of the vehicle that affect handling of the vehicle. Upon sensing heavy attachments on the front or rear of the vehicle, controller 20 adjusts the adjustable shock absorbers 18. For example, when a heavy attachment is put on to the front of a vehicle, the compression damping of the front shocks may be increased to help support the additional load.

In other illustrative embodiments of the present disclosure, methods for actively controlling damping of electronically adjustable shocks using both user selectable modes and a plurality of sensor inputs to actively adjust damping levels are disclosed. A central controller is used to read inputs from the plurality of vehicle sensors continuously and send output signals to control damping characteristics of the electronically adjustable shocks. Illustrative embodiments control damping of the plurality of electronically adjustable shocks based on one or more of the following control strategies:

Vehicle speed based damping table
    Roll control: Vehicle steering angle and rate of steer damping table
    Jump control: Detect air time and adjust damping accordingly
    Pitch control: Brake, dive, and squat
    Use of a lookup table or a multi-variable equation based on sensor inputs
    Acceleration sensing: Select damping based on frequency of chassis acceleration
    Load sensing: Increase damping based on vehicle/box load
    Oversteer/understeer detection
    Factory defaults, key-on mode selection
    Fail safe defaults to full firm
    Time delay that turns solenoid off after a set period of time to conserve power at idle In illustrative embodiments of the present disclosure, a user selectable mode provides damping control for the electronic shocks. In addition to the methods discussed above, the present disclosure includes modes selectable by the user through a knob, touch screen, push button or other user input. Illustrative user selectable modes and corresponding sensors and controls include:

In addition to damping control, the following bullet point items can also be adjusted in each mode:
  1. Factory Default Mode
  2. Soft/Comfort Mode
    Vehicle speed
    Turning
    Air born-jumps
    eCVT: Maintain low RPM>quiet
    higher assist EPS calibration
  3. Auto/Sport Mode
    Pitch control
    Tied to brake switch
    Throttle (CAN) position Roll control
Lateral acceleration
Steering position (EPS sensor)
Vehicle speed
"Auto" means use damping table or algorithm, which incorporates all these inputs
4. Firm/Race Mode
eCTV: Higher engagement
Aggressive throttle pedal map
Firm (lower assist at speed) EPS calibration
Full firm damping
5. Rock Crawling Mode
Increase ride height—spring preload
Rebound increase to deal with extra preload
Soft stabilizer bar
Speed limit
6. Desert/Dunes Mode
Soft stabilizer bar
Speed based damping
Firmer damping than "Soft"
7. Trail/Cornering Mode
Lower ride height
Stiffer stabilizer bar
Increase damping
Firm EPS calibration
8. Work Mode (Lock-out, full firm)
eCVT: Smooth engagement
eCVT: Maintain low RPM>quiet, dependent on engine load
Load sensing damping & preload
9. Economy Mode
Lower ride height
Engine cal
eCVT cal In illustrative embodiments of the present disclosure, sensor inputs include one or more of the following:
Damping mode selection
Vehicle speed
4WD mode
ADC mode
Transmission mode—CVT and other transmission types
EPS mode
Ambient temp
Steering angle
Chassis Acceleration (lateral, long, vertical)
Steering Wheel Acceleration
Gyroscope
GPS location
Shock position
Shock temperature
Box load/distribution
Engine sensors (rpm, temp, CAN)
Throttle pedal
Brake input/pressure
Passenger Sensor (weight or seatbelt)

Figure 6:
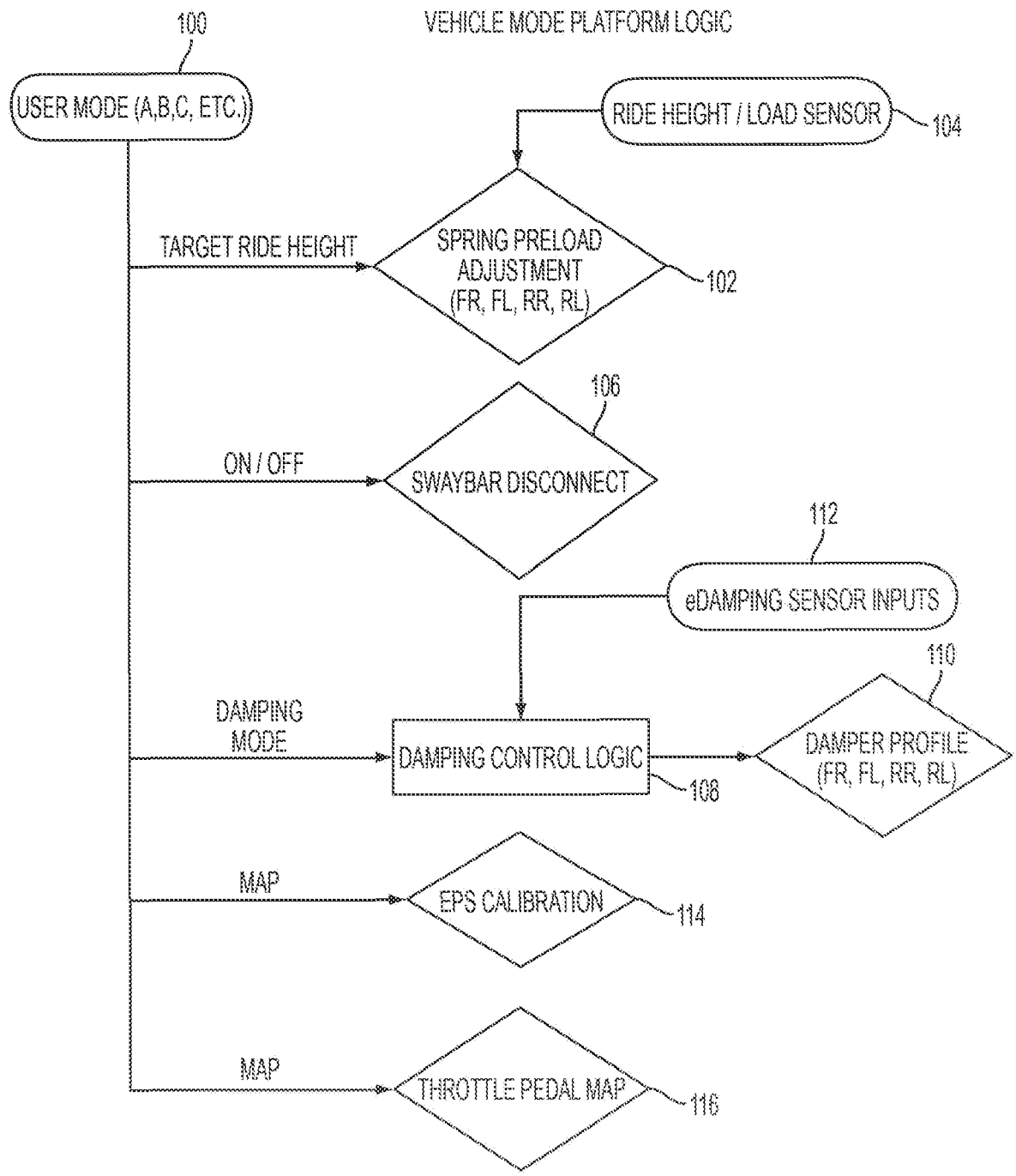
FIG. 6 is a flow chart illustrating vehicle platform logic for controlling various vehicle parameters in a plurality of different user selectable modes of operation.

In illustrative embodiments of the present disclosure, damping control system is integrated with other vehicle systems as follow:
Vehicle Systems Integration
EPS calibration
Unique calibrations for each driver mode. Full assist in work or comfort mode.
Automatic preload adjustment setting (electronic and/or hydraulic control)
Load leveling
Smooth trail/on-road mode=lower, Rock crawl=higher
Increase rebound damping for higher preloads
Haul mode=increased preload in rear. Implement mode=increased preload in front
Vehicle speed limits
Increase damping with vehicle speed for control and safety using lookup table or using an algorithm
adjusts the minimum damping level in all modes beside "Firm"
firm mode would be at max damping independent of vehicle speed
lower ride height (preload) with vehicle speed in certain modes
eCVT calibration
Unique calibrations for each driver mode that ties in with electronic damping and preload. (comfort mode=low rpm, soft damping)
Engine/pedal map calibration
Unique calibrations for each driver mode that ties in with electronic damping and preload. (comfort mode=soft pedal map, soft damping)
Steer by wire
Load sensing
Decoupled wheel speed for turning
4 wheel steer
Active Stabilizer Bar Adjustment
Traction Control
Stability Control
ABS
Active Brake Bias
Preload control FIG. 6 is a flow chart illustration vehicle mode platform logic for a system and method of the present disclosure. In the illustrated embodiment, a user selects a user mode as illustrated at block 100. The selection may be a rotary knob, a button, a touch screen input, or other user input. A controller 20 uses a look up cable or algorithm to determine preload adjustments for adjustable springs at the front right, front left, rear right and rear left of the vehicle to adjust a target ride height for the vehicle as illustrated at bock 102. Controller 20 receives a ride height and/or load sensor input as illustrated at block 104 so that the controller 20 adjusts the spring preload based on vehicle loads.

Controller 20 then determines whether a sway bar or stabilizer bar should be connected or disconnected as illustrated at block 106. As discussed in detail below, the stabilizer bar may be connected or disconnected depending upon the selected mode and sensor inputs.

Controller 20 also implements damping control logic as discussed below and illustrated at block 108. Controller 20 uses a damper profile for the front right, front left, rear right, and rear left adjustable shocks as illustrated block 110. A plurality of sensor inputs are provided to the controller 20 as illustrated at block 112 and discussed in detail below to continuously control the damping characteristics of the adjustable shocks.

Figure 7:
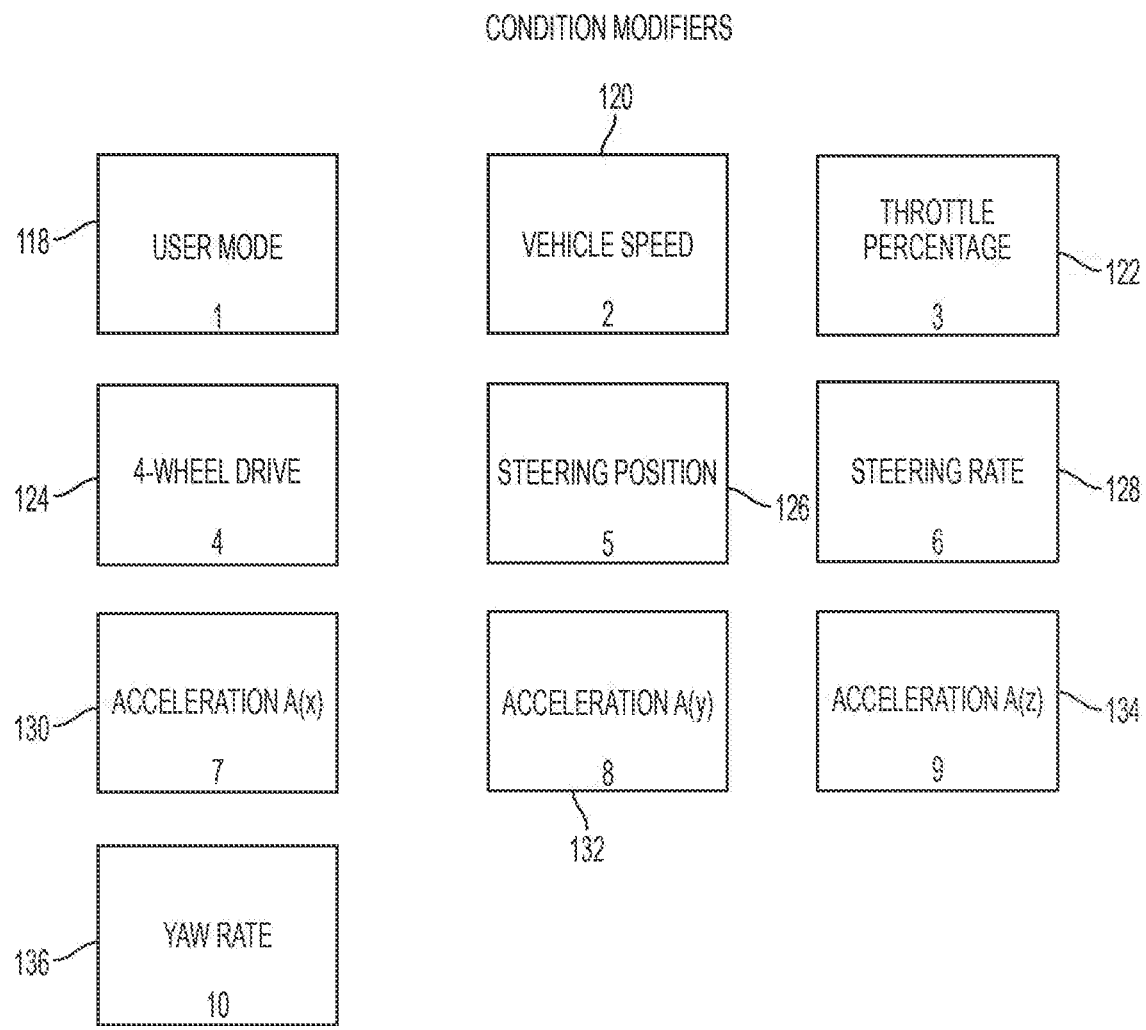
FIG. 7 is a block diagram illustrating a plurality of different condition modifiers used as inputs in different control modes to modify damping characteristics of electronically adjustable shock absorbers or dampers in accordance with the present disclosure.
Figure 14:
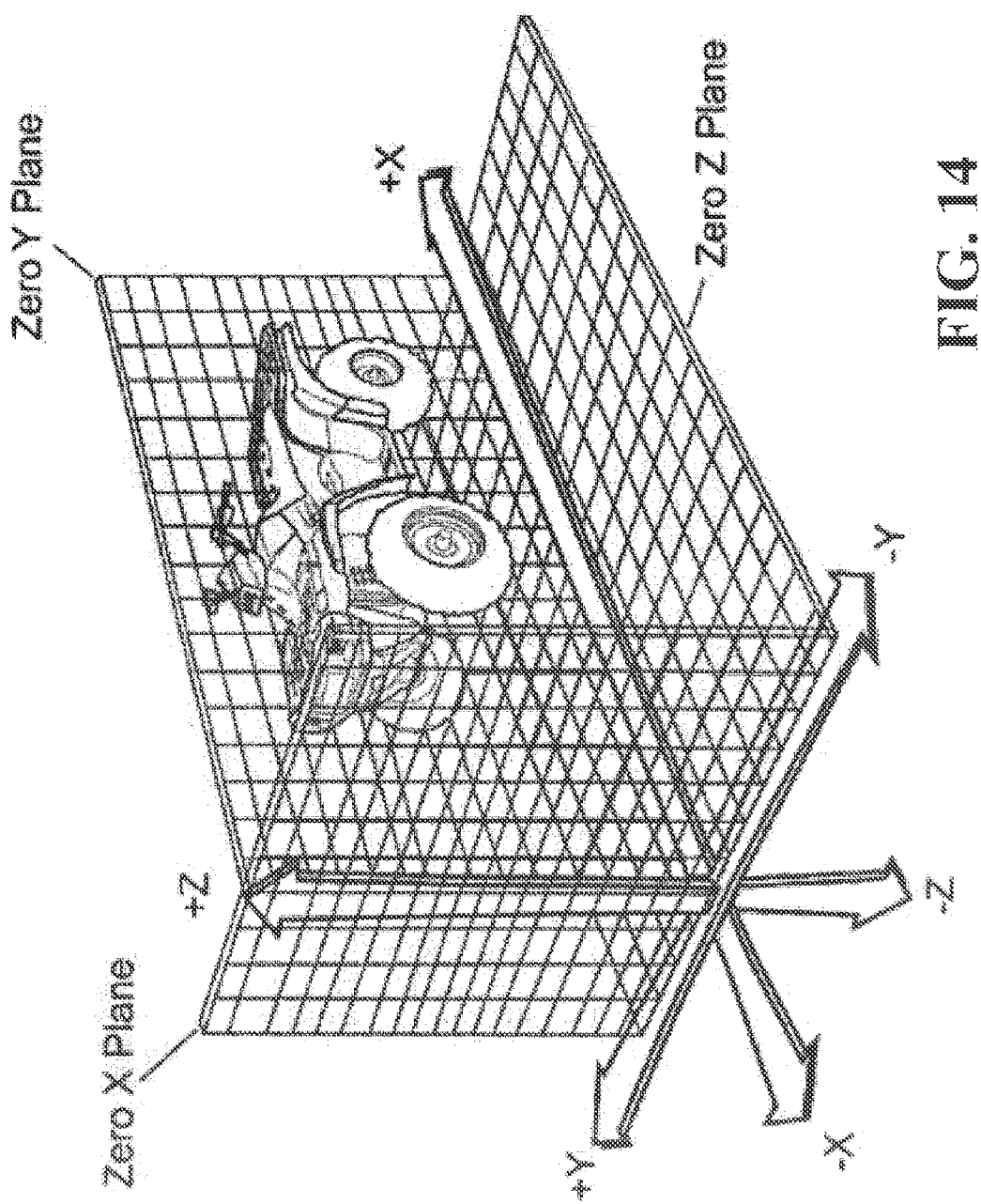
FIG. 14 illustrates an x-axis, a y-axis, and a z-axis for a vehicle such as an ATV.

Controller 20 uses a stored map for calibration of an electronic power steering (EPS) of the vehicle as illustrated at block 114. Finally, the controller 20 uses a map to calibrate a throttle pedal position of the vehicle as illustrated at block 116. The damping control method of the present discloses uses a plurality of different condition modifiers to control damping characteristics of the electrically adjustable shocks. Exemplary condition modifiers include parameters set by the particular user mode selected as illustrated at block 118, a vehicle speed as illustrated at block 120, a throttle percentage as illustrated at block 122. Additional condition modifiers include a drive mode sensor such as 4-wheel drive sensor as illustrated at block 124, a steering position sensor as illustrated at block 126, and a steering rate sensor as illustrated at block 128. Drive mode sensor 124 may include locked front, unlocked front, locked rear, unlocked rear, or high and low transmission setting sensors. Condition modifiers further include an x-axis acceleration sensor as illustrated at block 130, a y-axis acceleration sensor as illustrated at block 132, and a z-axis acceleration sensor illustrated at block 134. The x-axis, y-axis, and z-axis for a vehicle such as an ATV are shown in FIG. 14. Another illustrative condition modifier is a yaw rate sensor as illustrated at block 136. The various condition modifiers illustrated in FIG. 7 are labeled 1-10 and correspond to the modifiers which influence operation of the damping control logic under the various drive conditions shown in FIGS. 8-10.

In a passive method for controlling the plurality of electronic shock absorbers, the user selected mode discussed above sets discrete damping levels at all corners of the vehicle. Front and rear compression and rebound are adjusted independently based on the user selected mode of operation without the use of active control based on sensor inputs.

Figure 8:
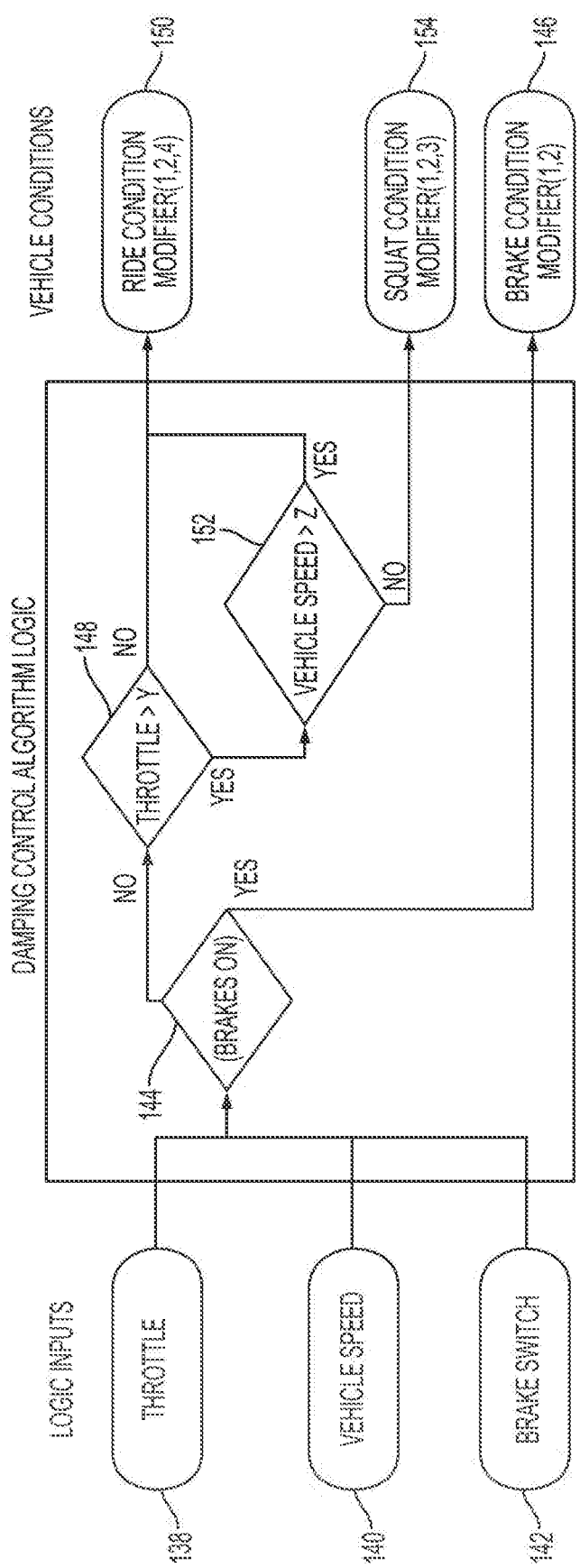
FIG. 8 is a flow chart illustrating a damping control method for controlling the vehicle operating under a plurality of vehicle conditions based upon a plurality of sensor inputs in accordance with one embodiment of the present invention.

One illustrated method for active damping control of the plurality of electronic shock absorbers is illustrated in FIG. 8. The method of FIG. 8 uses a throttle sensor 138, a vehicle speed sensor 140, and a brake switch or brake pressure sensor 142 as logic inputs. The controller 20 determines whether the brakes are on as illustrated at block 144. If so, the controller 20 operates the damping control method in a brake condition as illustrated at block 146. In the brake condition, front suspension compression (dive) is detected as a result of longitudinal acceleration from braking input. In the Brake Condition 146, the condition modifiers include the user selected mode 118 and the vehicle speed 120 to adjust damping control. In the vehicle conditions of FIGS. 8-10, the selected user mode modifier 118 determines a particular look-up table that defines damping characteristics for adjustable shocks at the front right, front left, rear right, and rear left of the vehicle. In brake condition 146, compression damping of the front shocks and/or rebound damping on the rear shocks is provided based on the brake signal.

In the Brake Condition 146, the controller 20 increases damping based on increasing vehicle speed. Further, controller 20 increases compression damping on front and/or rebound damping on the rear shocks based on brake sensor signal. User mode modifiers 118 select the lookup table and/or algorithm that defines the damping characteristics at each corner based on above inputs.

If the brakes are not on at block 144, controller 20 determines whether the throttle position is greater than a threshold Y as illustrated at block 148. If not, controller 20 operates the vehicle in a Ride Condition as illustrated at block 150. In the ride condition, the vehicle is being operated in generally a straight line where vehicle ride and handling performance while steering and cornering is not detected. In the Ride Condition 150, condition modifiers used to control damping include user mode 118, vehicle speed 120, and a drive mode sensor such as 4-wheel drive sensor 124. In the Ride Condition 150, the controller 20 increases damping based on the vehicle speed. User mode modifiers 118 select the lookup table and/or algorithm that defines the damping characteristics at each corner based on above inputs.

If the throttle position in greater than the threshold Y at block 148, the controller 20 determines whether a vehicle speed is greater than a threshold value Z at block 152. If so, the controller 20 operates the vehicle in the Ride Condition at block 150 as discussed above. If the vehicle speed is less than the threshold value Z at block 152, the controller 20 operates the vehicle in a Squat Condition as illustrated at block 154. In the Squat Condition 154, condition modifiers for controlling damping include the user selected mode 118, the vehicle speed 120, and the throttle percentage 122. During a Squat Condition 154, compression damping on the rear shocks and/or rebound damping on the front shocks is increased based upon the throttle sensor signal and vehicle speed. Rear suspension compression (squat) is a result of longitudinal acceleration from throttle input.

In the Squat Condition 154, the controller 20 increases damping based on increasing vehicle speed. Further, controller 20 increases compression damping on rear and/or rebound damping on the front shocks based on the throttle sensor signal and vehicle speed. User mode modifiers 118 select the lookup table and/or algorithm that defines the damping characteristics at each corner based on above inputs.

Figure 9:
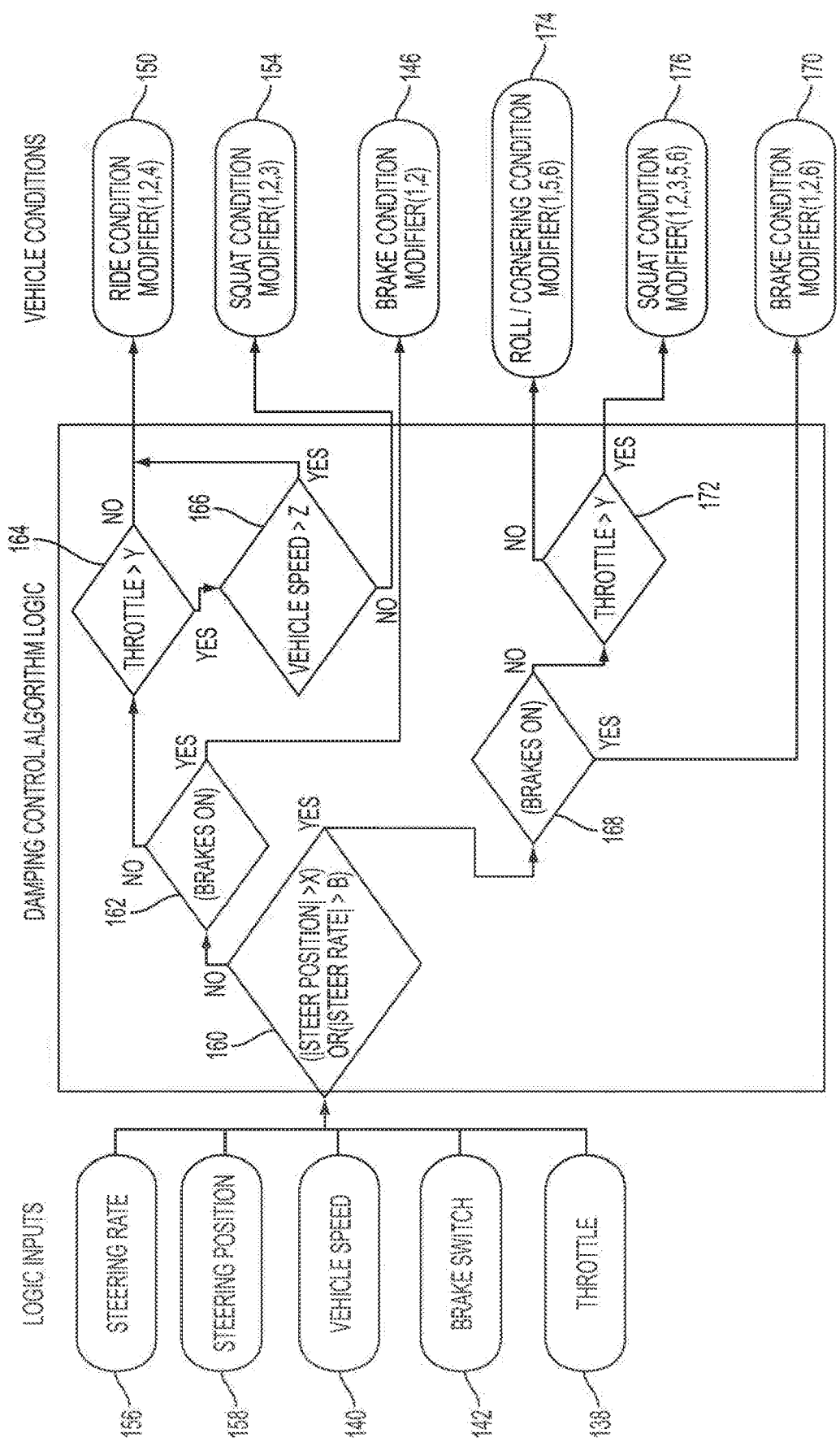
FIG. 9 is a flow chart illustrating another embodiment of a damping control method of the present disclosure.

Another embodiment of the present disclosure including different sensor input options is illustrated in FIG. 9. In the FIG. 9 embodiment, a throttle sensor 138, vehicle speed sensor 140, and brake sensor 142 are used as inputs as discussed in FIG. 8. In addition, a steering rate sensor 156 and steering position sensor 158 also provide inputs to the controller 20. Controller 20 determines whether an absolute value of the steering position is greater than a threshold X or an absolute value of the steering rate is greater than a threshold B as illustrated at block 160. If not, controller 20 determines whether the brakes are on as illustrated at block 162. If not, controller 20 determines whether the throttle position is greater than a threshold Y as illustrated at block 164. If the throttle position is greater than the threshold Y at block 164, controller 20 operates the vehicle in the Ride Condition as illustrated at block 150 and discussed above. In the Ride Condition 150, the controller 20 increases damping based on the vehicle speed. User mode modifiers 118 select the lookup table and/or algorithm that defines the damping characteristics at each corner based on above inputs.

If the throttle position is greater than the threshold Y at block 164, controller 20 determines whether the vehicle speed is greater than a threshold Z as illustrated at block 166. If so, controller 20 operates the vehicle in the Ride Condition as illustrated at block 150. If the vehicle speed is less than the threshold Z at block 166, controller 20 operates the vehicle in Squat Condition 154 discussed above with reference to FIG. 8. In the Squat Condition 154, the controller 20 increases damping based on increasing vehicle speed. Further controller 20 increases compression damping on rear and/or rebound damping on the front shocks based on the throttle sensor signal and vehicle speed. User mode modifiers 118 select the lookup table and/or algorithm that defines the damping characteristics at each corner based on above inputs.

If the brakes are on at block 162, controller 20 operates the vehicle in the Brake Condition 146 as discussed above with reference to FIG. 8. In the Brake Condition 146, the controller 20 increases damping based on increasing vehicle speed. Further controller 20 increases compression damping on front and/or rebound damping on the rear shocks based on brake sensor signal. User mode modifiers 118 select the lookup table and/or algorithm that defines the damping characteristics at each corner based on above inputs.

If the absolute value of the steering position is greater than the threshold X or the absolute value of the steering rate is greater than the threshold B at block 160, controller 20 determines whether the brakes are on as illustrated at block

168. If so, controller 20 operates the vehicle in a Brake Condition as illustrated at block 170. In the Brake Condition 170, mode modifiers for controlling damping include the user input 118, the vehicle speed 120, and the steering rate 128.

In the Brake Condition 170, the controller 20 increases damping based on increasing vehicle speed. Further, controller 20 increases compression damping on the outside front corner shock based on inputs from the steering sensor, brake sensor, and vehicle speed sensor. User mode modifiers 118 select the lookup table and/or algorithm that defines the damping characteristics at each corner based on above inputs.

If the brakes are not on at block 168, controller 20 determines whether the throttle position is greater than a threshold Y as illustrated at block 172. If not, vehicle controller 20 operates the vehicle in a Roll/Cornering Condition as illustrated at block 174. In the Roll/Cornering Condition at block 174, the condition modifiers for controlling damping include user mode 118, the steering position 126, and the steering rate 128. In a Roll/Cornering Condition, vehicle body roll occurs as a result of lateral acceleration due to steering and cornering inputs.

In the Roll/Cornering Condition 174, the controller 20 increases damping based on increasing vehicle speed. Further controller 20 increases compression damping on the outside corner shocks and/or rebound damping on the inside corner shocks when a turn event is detected via steering sensor. For a left hand turn, the outside shock absorbers are the front right and rear right shock absorbers and the inside shock absorbers are front left and rear left shock absorbers. For a right hand turn, the outside shock absorbers are the front left and rear left shock absorbers and the inside shock absorbers are front right and rear right shock absorbers. User mode modifiers 118 select the lookup table and/or algorithm that defines the damping characteristics at each corner based on above inputs.

If the throttle position is greater than the threshold Y at block 172, controller 20 operates the vehicle in a Squat Condition as illustrated at block 176. In the Squat Condition 176, controller 20 uses the mode modifiers for user mode 118, vehicle speed 120, throttle percentage 122, steering position 126, and steering rate 128 to control the damping characteristics. Again, damping is increased base on increasing vehicle speed. In addition, compression damping is increased on outside rear corners based upon steering sensor, throttle sensor and vehicle speed.

In the Squat Condition 176, the controller 20 increases damping based on increasing vehicle speed. Further, controller 20 increases compression damping on the outside rear corner shock based on inputs from the steering sensor, throttle sensor, and vehicle speed. User mode modifiers 118 select the lookup table and/or algorithm that defines the damping characteristics at each corner based on above inputs.

Figure 10:
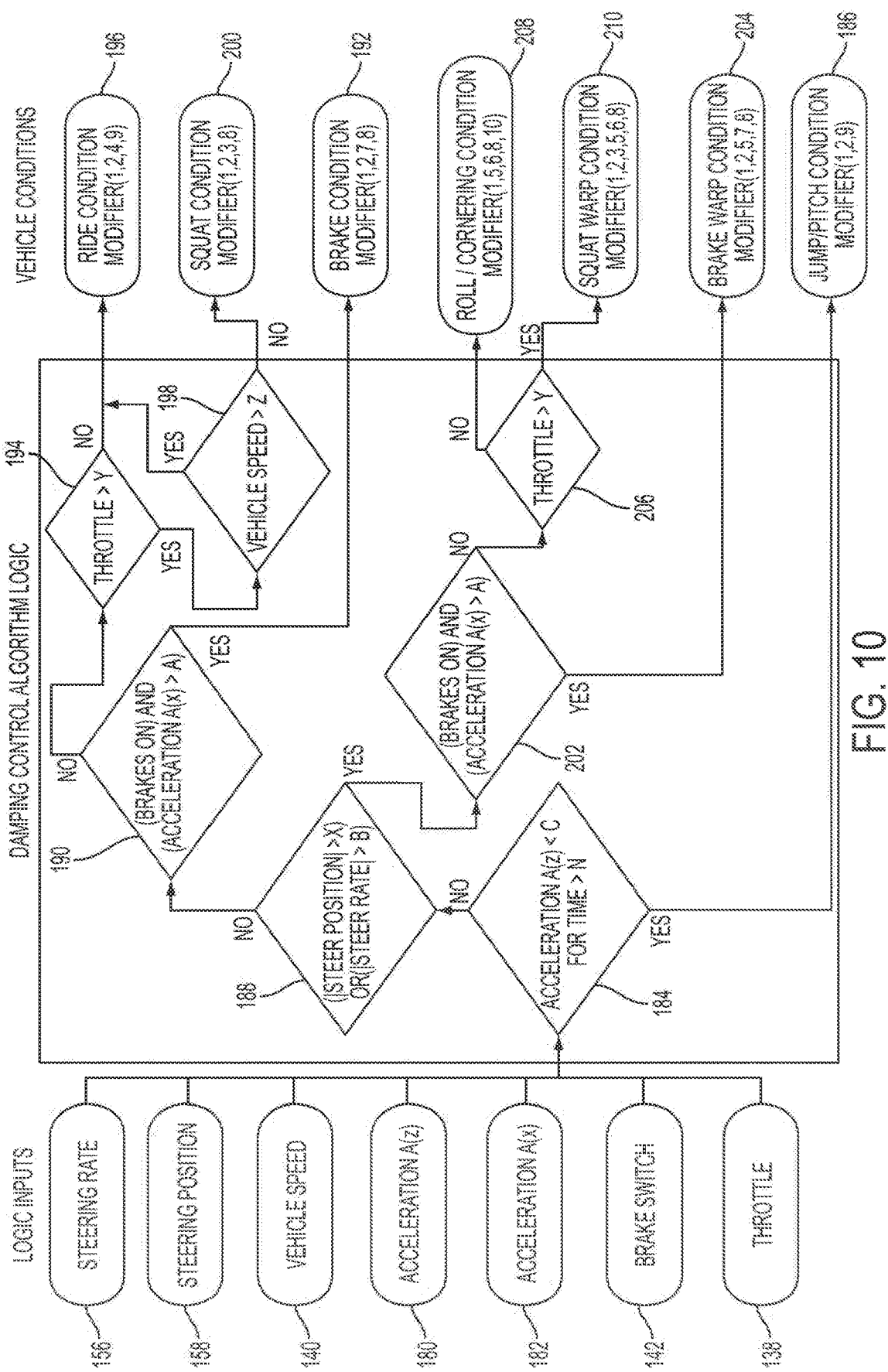
FIG. 10 is a flow chart illustrating yet another damping control method of the present disclosure.

FIG. 10 illustrates yet another embodiment of a damping control method of the present disclosure including different sensor input options compared to the embodiments of FIGS. 8 and 9. In addition to throttle sensor 138, vehicle speed sensor 140, brake sensor 142, steering position sensor 158, and steering rate sensor 156, the embodiment of FIG. 10 also uses a z-axis acceleration sensor 180 and an x-axis acceleration sensor 182 as inputs to the controller 20.

Controller 20 first determines whether acceleration from the z-axis sensor 180 is less than a threshold C for a time greater than a threshold N as illustrated at block 184. If so, controller 20 determines that the vehicle is in a jump and controls the vehicle in a Jump/Pitch condition as illustrated at block 186 where the suspension is allowed to drop out and the tires lose contact with the ground surface. In the Jump/Pitch Condition 186, controller 20 uses condition modifiers for the user input 118, the vehicle speed 120, and the z-axis acceleration sensor 134 to control the damping characteristics.

In the Jump/Pitch Condition 186, the controller 20 increases damping based on increasing vehicle speed. Further, controller 20 increases compression damping on shocks at all four corners when an airborne event is detected (and the duration of the airborne event) via negative vertical acceleration detected by the z-axis acceleration sensor 134. The controller 20 maintains the damping increase for a predetermined duration after the jump event. If positive vertical acceleration is detected by z-axis acceleration sensor 134 having a magnitude greater than a threshold value and for longer than a threshold duration (such as when contact with the ground is made after an airborne event), whereas greater acceleration reduces the duration threshold required, rebound damping may be increased to the rear and/or front shocks for an amount of time. User mode modifiers 118 select the lookup table and/or algorithm that defines the damping characteristics at each corner based on above inputs.

If an airborne event is not detected at block 184, controller 20 determines whether an absolute value of the steering position is greater than a threshold X or an absolute value of the steering rate is greater than a threshold B at block 188. If not, controller 20 determines whether the brakes are on and the x-axis acceleration is greater than a threshold value A at block 190. If so, controller 20 operates the vehicle in a Brake Condition as illustrated at block 192.

In the Brake Condition 192, condition modifiers for the user input 118, the vehicle speed 120, the x-axis accelerometer 130, and the y-axis accelerometer 132 are used as inputs for the damping control. In the Brake Condition 192, the controller 20 increases damping based on increasing vehicle speed. Further, controller 20 increases compression damping on an outside front corner shock based on inputs from steering sensor 158, brake sensor 142, vehicle speed sensor 140, and/or acceleration sensor 180. User mode modifiers 118 select the lookup table and/or algorithm that defines the damping characteristics at each corner based on above inputs.

If the determination at block 190 is negative, controller 20 determines whether the throttle position is greater than a threshold Y as illustrated at block 194. If not, controller 20 operates the vehicle in a Ride Condition as illustrated at block 196. In the Ride Condition 196, controller 20 uses condition modifiers for the user-selected mode 118, the vehicle speed 120, a drive mode sensor such as four-wheel drive sensor 124, and the z-axis accelerometer 134 to control damping characteristics. In the Ride Condition 196, the controller 20 increases damping based on the vehicle speed. User mode modifiers 118 select the lookup table and/or algorithm that defines the damping characteristics at each corner based on above inputs.

If the throttle position is greater than threshold Y at block 194, controller 20 determines whether the vehicle speed is greater than a threshold Z as illustrated at block 198. If so, the controller 20 operates the vehicle and the Ride Condition 196 as discussed above. If not, the controller 20 operates the vehicle in a Squat Condition as illustrated at block 200. In the Squat Condition 200, controller 20 uses condition modifiers for the user mode 118, vehicle speed 120, throttle percentage 122, and y-axis accelerometer 132 for damping control. In the Squat Condition 200, the controller 20 increases damping based on the vehicle speed. Further, the controller 20 increases compression damping on the rear shocks and/or rebound damping on the front shocks based on inputs from throttle sensor 138, vehicle speed sensor 140, and/or acceleration sensor 180. Additional adjustments are made based on time duration and longitudinal acceleration. User mode modifiers 118 select the lookup table and/or algorithm that defines the damping characteristics at each corner based on above inputs.

If the absolute value of the steering position is greater than the threshold X or the absolute value of the steering rate is greater than the threshold B at block 188, then controller 20 determines whether the brakes are on and whether the x-axis acceleration is greater than a threshold A as illustrated at block 202. If so, controller 20 operates the vehicle in a Brake Condition as illustrated at block 204. In the Brake Condition 204, controller 20 uses condition modifiers for the user mode 118, vehicle speed 120, steering position 126, x-axis acceleration 130, and y-axis acceleration 132 to adjust the damping control characteristics of the electrically adjustable shocks. In the Brake Condition 204, the controller 20 increases damping based on increasing vehicle speed. Further, controller 20 increases compression damping on an outside front corner shock based on inputs from steering sensor 158, brake sensor 142, vehicle speed sensor 140, and/or acceleration sensor 180. User mode modifiers 118 select the lookup table and/or algorithm that defines the damping characteristics at each corner based on above inputs.

If a negative determination is made at block 202, controller 20 determines whether the throttle position is greater than a threshold Y as illustrated at block 206. If not, controller 20 operates the vehicle in a Roll/Cornering Condition as illustrated at block 208. In the Roll/Cornering Condition 208, controller 20 uses condition modifiers for the user mode 118, the steering position 126, the steering rate 128, the y-axis acceleration 132, and the yaw rate 136 to control the damping characteristics of the adjustable shocks. In the Roll/Cornering Condition 208, the controller 20 increases damping based on increasing vehicle speed. Further, controller 20 increases compression damping on the outside corner shocks and/or rebound damping on the inside corner shocks when a turn event is detected via steering sensor 156 and accelerometer 182. User mode modifiers 118 select the lookup table and/or algorithm that defines the damping characteristics at each corner based on above inputs.

If the throttle position is greater than the threshold Y at block 206, controller 20 operates the vehicle in a Squat Condition as illustrated at block 210. In the Squat Condition 210, controller 20 uses condition modifiers for the user mode 118, the vehicle speed 120, the throttle percentage 122, steering position 126, the steering rate 128, and the y-axis acceleration 132 to control the damping characteristics of the adjustable shocks. In the Squat Condition 210, the controller 20 increases damping based on the vehicle speed. Further, the controller 20 increases compression damping on the outside rear corner shock based on inputs from throttle sensor 138, vehicle speed sensor 140, and/or acceleration sensors 180 or 182. User mode modifiers 118 select the lookup table and/or algorithm that defines the damping characteristics at each corner based on above inputs.

Another embodiment of the present disclosure is illustrated in FIGS. 11-13. As part of the damping control system, a stabilizer bar linkage 220 is selectively locked or unlocked. The linkage 220 includes a movable piston 222 located within a cylinder 224. An end 226 of piston 222 as illustratively coupled to a stabilizer bar of the vehicle. An end 228 of cylinder 224 as illustratively coupled to a suspension arm or component of the vehicle. It is understood that this connection could be reversed.

A locking mechanism 230 includes a movable solenoid 232 which is biased by a spring 234 in the direction of arrow 236. The controller 20 selectively energizes the solenoid 232 to retract the removable solenoid 232 in the direction of arrow 238 from an extended position shown in FIGS. 11 and 12 to a retracted position shown in FIG. 13. In the retracted position, the end of solenoid 232 disengages a window 240 of movable piston 232 to permit free movement between the piston 222 and the cylinder 224. If the solenoid 232 is in the extended position shown in FIGS. 11 and 12 engaged with window 240, the piston 222 is locked relative to the cylinder 224.

When the linkage 220 is unlocked, the telescoping movement of the piston 222 and cylinder 224 removes the function of the stabilizer bar while the solenoid 232 is disengaged as shown in FIG. 13. When the controller 20 removes the signal from the solenoid 232, the solenoid piston 232 moves into the window 240 to lock the piston 222 relative to the cylinder 220. The solenoid 232 also enters the lock position if power is lost due to the spring 234. In other words, the solenoid 232 fails in the locked position. The vehicle is not required to be level in order for the solenoid 232 to lock the piston 222.

Unlocking the stabilizer bar 220 provides articulation benefits for the suspension system during slow speed operation. Therefore, the stabilizer bar 220 is unlocked in certain low speed conditions. For higher speeds, the stabilizer bar 220 is locked. The controller 20 may also use electronic throttle control (ETC) to limit vehicle speed to a predetermined maximum speed when stabilizer bar 220 is unlocked.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:
1. A vehicle, comprising:
a plurality of ground engaging members;
a frame supported by the plurality of ground engaging members
a first suspension for a first ground engaging member of the plurality of ground engaging members, the first suspension comprises a first shock absorber;
a second suspension for a second ground engaging member of the plurality of ground engaging members, the second suspension comprises a second shock absorber;
a third suspension for a third ground engaging member of the plurality of ground engaging members rearward of the first and second suspension, the third ground engaging member comprising a track, wherein the third suspension comprises:
an adjustable shock absorber operable according to an adjustable damping characteristic; and
a controller operably coupled to the third suspension, the controller operable to control at least one damping characteristic of the adjustable shock absorber, the at least one damping characteristic including a rebound damping characteristic.

2. The vehicle of claim 1, wherein the first suspension is a front suspension and the third suspension is a rear suspension.

3. The vehicle of claim 1, wherein the first shock absorber is a first adjustable shock absorber, the second shock absorber is a second adjustable shock absorber and the adjustable shock absorber of the third suspension is a third adjustable shock absorber, and the first suspension is a front left suspension, the second suspension is a front right suspension, and the third suspension is a rear suspension.

4. The vehicle of claim 1, further comprising a user input operably coupled to the controller, and the controller is operable to control the at least one damping characteristic of the adjustable shock absorber based on a signal provided from the user input.

5. The vehicle of claim 4, wherein the user input is operable to select between a first ride mode and a second ride mode, and the controller is operable to control the at least one damping characteristic according to a first damping characteristic when the first ride mode is selected and according to a second damping characteristic when the second ride mode is selected.

6. The vehicle of claim 4, further comprising a steering input, and the user input is coupled to the steering input.

7. The vehicle of claim 1, wherein the first ground engaging member comprises a first ski and the second ground engaging member comprises a second ski.

8. The vehicle of claim 1, wherein the at least one damping characteristic further includes a compression damping characteristic.

9. The vehicle of claim 1, wherein the first suspension is a front suspension, the third suspension is a rear suspension, the first shock absorber is a first adjustable shock absorber, the adjustable shock absorber of the third suspension is a third adjustable shock absorber, and the controller is operable to independently control at least one damping characteristic of the first adjustable shock absorber and the at least one damping characteristic of the third adjustable shock absorber.

10. The vehicle of claim 9, wherein the controller is operable to determine a braking event, and in response to the braking event the controller is operable to increase a compression damping characteristic of the first adjustable shock absorber and increase the rebound damping characteristic of the third adjustable shock absorber.

11. The vehicle of claim 9, wherein the controller is operable to determine an acceleration event, and in response to the acceleration event the controller is operable to increase a compression damping characteristic of the third adjustable shock absorber.

12. The vehicle of claim 1, further comprising a display, and the display is operable to provide a visual indication of the at least one damping characteristic of the adjustable shock absorber.

13. The vehicle of claim 1, wherein the third suspension further comprises a suspension arm, and the adjustable shock absorber is coupled to the suspension arm.

14. The vehicle of claim 13, further comprising a sensor associated with the third suspension for monitoring a characteristic of the third suspension.

15. The vehicle of claim 14, wherein the controller is operable to control the at least one damping characteristic of the adjustable shock absorber based on the sensor.

16. The vehicle of claim 14, wherein the sensor is an angle sensor.

17. The vehicle of claim 16, wherein the sensor is operably coupled to the suspension arm.

* * * * *